(12) United States Patent
Ohnuma et al.

(10) Patent No.: US 12,439,243 B2
(45) Date of Patent: Oct. 7, 2025

(54) NETWORK SYSTEM, COMMUNICATION CONTROL DEVICE, AND COMMUNICATION CONTROL METHOD

(71) Applicant: Hitachi, Ltd., Tokyo (JP)

(72) Inventors: Akihiro Ohnuma, Tokyo (JP); Daisuke Mashimo, Tokyo (JP); Masayuki Takase, Tokyo (JP); Yuji Oishi, Tokyo (JP); Mikio Kuwahara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 368 days.

(21) Appl. No.: 18/122,205

(22) Filed: Mar. 16, 2023

(65) Prior Publication Data

US 2023/0422025 A1  Dec. 28, 2023

(30) Foreign Application Priority Data

Jun. 24, 2022 (JP) .................................. 2022-101778

(51) Int. Cl.
*H04W 8/26* (2009.01)
*G16Y 20/20* (2020.01)

(52) U.S. Cl.
CPC ............... *H04W 8/26* (2013.01); *G16Y 20/20* (2020.01)

(58) Field of Classification Search
CPC .................................. H04W 8/26; G16Y 20/20
See application file for complete search history.

(56) References Cited

U.S. PATENT DOCUMENTS

| | | | | |
|---|---|---|---|---|
| 6,895,483 B2 * | 5/2005 | Eguchi | .................. | G06F 3/0649 711/111 |
| 10,432,632 B2 * | 10/2019 | Jin | ...................... | H04W 12/069 |
| 11,409,509 B2 * | 8/2022 | Yoon | ...................... | H04L 67/125 |
| 2008/0214189 A1 * | 9/2008 | Taaghol | .................. | H04L 69/08 455/432.2 |
| 2010/0205268 A1 * | 8/2010 | Zhu | ......................... | H04L 69/18 709/206 |
| 2014/0156844 A1 * | 6/2014 | Cavgalar | ............. | H04L 65/1073 709/225 |

(Continued)

OTHER PUBLICATIONS

Yuji Oishi, et al., "A study on interconnection between local 5G networks and existing networks", IEICE Communications Express, vol. 10, No. 12, pp. 888-893, IEICE General Conference 2021.

*Primary Examiner* — Abdullahi E Salad
(74) *Attorney, Agent, or Firm* — MATTINGLY & MALUR, PC

(57) ABSTRACT

It is provided a network system that transfers data, the network system comprising: a first network; a second network connected with the first network and to which a server is connected; a third network connected with the first network and in which a terminal is accommodated; a terminal identification device, wherein the terminal identification device is configured to hold terminal identification information in which the address information of the gateway device in the first network, an identifier of the terminal, and the connection availability of the terminal to the second network are associated with each other, determine the connection availability of the terminal to the second network based on the terminal identification information, and acquire the address information of the gateway device in the first network and the identifier of the terminal from the gateway device to register or update the terminal identification information.

8 Claims, 18 Drawing Sheets

(56) References Cited

U.S. PATENT DOCUMENTS

| | | | |
|---|---|---|---|
| 2015/0347114 A1* | 12/2015 | Yoon | H04L 12/2832 717/176 |
| 2019/0220264 A1* | 7/2019 | Yoon | G06F 8/61 |

* cited by examiner

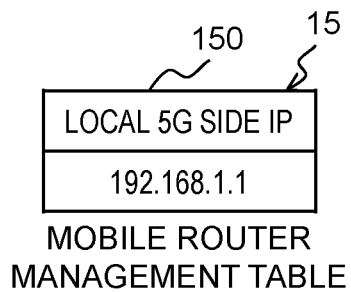
MOBILE ROUTER
MANAGEMENT TABLE
Fig. 4
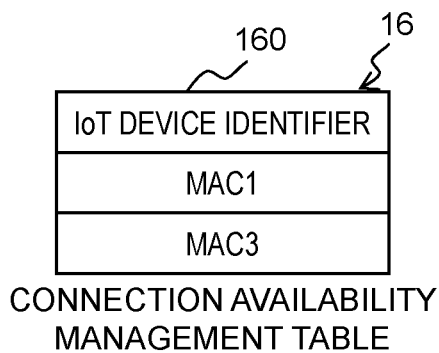
CONNECTION AVAILABILITY
MANAGEMENT TABLE
Fig. 5
| LOCAL 5G SIDE IP | MOBILE ROUTER PORT NUMBER | IoT DEVICE IDENTIFIER | CONNECTION AVAILABILITY |
|---|---|---|---|
| 192.168.1.1 | 1101 | MAC1 | AVAILABLE |
| | 1102 | MAC2 | UNAVAILABLE |
| 192.168.1.2 | - | MAC3 | AVAILABLE |
IoT DEVICE IDENTIFICATION TABLE
Fig. 6

| 2150 | 2151 | 2152 | 215 |
|---|---|---|---|
| DESTINATION NETWORK ADDRESS | NEXT HOP TERMINAL IP | OUTPUT DESTINATION INTERFACE | |
| 192.168.10.0/24 | DIRECTLY CONNECTED | LAN SIDE INTERFACE | |
| 192.168.1.0/24 | MOBILE CORE DEVICE IP | LOCAL 5G SIDE INTERFACE | |

ROUTING TABLE

*Fig. 7*

| 2160 | 2161 | 2162 | 216 |
|---|---|---|---|
| IP | MAC | OUTPUT DESTINATION INTERFACE | |
| 192.168.10.1 | MAC1 | LAN SIDE INTERFACE | |
| 192.168.10.2 | MAC2 | LAN SIDE INTERFACE | |
| 192.168.1.2 | MAC3 | LOCAL 5G SIDE INTERFACE | |

ARP TABLE

*Fig. 8*

| 2170 | 2171 | 2172 | 2173 | 217 |
|---|---|---|---|---|
| LOCAL 5G SIDE IP | LOCAL 5G SIDE PORT NUMBER | LAN SIDE IP | LAN SIDE PORT NUMBER | |
| 192.168.1.1 | 1101 | 192.168.10.1 | 1001 | |
| | 1102 | 192.168.10.2 | 1002 | |

NAPT TABLE

*Fig. 9*

IoT DEVICE MANAGEMENT TABLE

NETWORK SYSTEM, COMMUNICATION CONTROL DEVICE, AND COMMUNICATION CONTROL METHOD

CLAIM OF PRIORITY

The present application claims priority from Japanese patent application JP 2022-101778 filed on Jun. 24, 2022, the content of which is hereby incorporated by reference into this application.

BACKGROUND OF THE INVENTION

The present invention relates to a network system, particularly to a method of identifying and managing a communication terminal.

The local 5G that has been institutionalized in December, 2019 enables freely construction of a high-speed, low-delay, and secure wireless communication infrastructure as compared to Wi-Fi. Therefore, the local 5G has been expected to be utilized as a stable wireless communication infrastructure that takes the place of Wi-Fi in various industries such as manufacturing, logistics, and building. In recent years, particularly in the field of manufacturing, aggregation of data acquired by IoT devices such as sensors and cameras in each factory to a trunk system in a trunk network for the purpose of monitoring and optimizing manufacturing processes by management of devices in the entire factory has been drawn attention. Therefore, interconnection between the local 5G network in each factory and the trunk network is desired. IoT devices are vulnerable since IoT devices have few hardware resources and cannot perform sufficient security measurement. For this reason, in order to reduce the security risk of the trunk network at the time of interconnection, connection availability of each IoT device to the trunk network needs to be controlled.

As a connection mode of the IoT device to the local 5G network, there are a method of directly connecting the IoT device with the local 5G network and a method of connecting the IoT device via a mobile router having an address conversion function. In a case of interconnecting the local 5G network and the trunk network, IoT devices connected by these connection methods need to be identified in order to control connection availability for each IoT device.

For identification of the IoT device, there is a method of identifying the IoT device by installing a terminal identification device in a connection interface of the local 5G and the trunk network, inputting in advance and managing correspondence between an identifier (for example, ID, static IP address, and MAC address) of the IoT device and header information of a packet in the terminal identification device by a network administrator of the local 5G, and performing a search in a correspondence table by using header information of a reception packet in the terminal identification device to acquire the identifier of the IoT device.

As a background art of the present technical field, there is a prior art as follows. Non Patent Literature 1 discloses a terminal identification device installed between a local 5G network that transfers a packet by using an IP in a layer 3 of an OSI model and a trunk network that transfers a packet by using a MAC in a layer 2 of the OSI model, in interconnection between the local 5G network and the trunk network. The terminal identification device associates the local 5G side IP of the IoT device, the trunk network side MAC, and the trunk network side IP with each other and holds them in the form of a table. Before communication, the terminal identification device is authenticated by an authentication unit in the trunk network by using the trunk network side MAC input by a network administrator. In a case where the terminal identification device is authenticated, the terminal identification device acquires the trunk network side IP from a DHCP server and updates the table. The terminal identification device identifies the IoT device by using the transmission IP for each packet transferred from the local 5G network to the trunk network. Then, in a case where the IoT device has been authenticated, the terminal identification device converts a transmission source of the packet from the local 5G side IP into the trunk network side IP and transfers the trunk network side IP to the trunk network, and in a case where the IoT device has not been authenticated, the terminal identification device discards the packet. As a result, in the method of connecting the IoT device directly with the local 5G network, it is possible to identify the IoT device and then control the connection availability to the trunk network.

Non Patent Literature

Non Patent Literature 1: Y. Oishi et al, IEICE Communications Express 10,888 (2021)

SUMMARY OF THE INVENTION

In the background art as described above, the IoT device is identified on the basis of the transmission source IP address of the packet at the connection interface in the method of connecting the IoT device directly with the local 5G network, and identification of the IoT device in the method of connecting the IoT device with the local network via the mobile router is not considered. In a case of connecting the IoT device with the local 5G network via the mobile router, the transmission source IP address and the port number of the packet are converted from the IP address and the port number of the controlled IoT device into the IP address and the port number of the mobile router by the address conversion function of the mobile router. Therefore, in the method of connecting the IoT device with the local 5G network via the mobile router, the terminal identification device at the connection interface cannot identify the IoT device on the basis of the transmission source IP address.

The present invention provides a technology of, in a case where an IoT device is connected with a trunk network via an address conversion function, acquiring and updating address information for a terminal identification device at a connection interface identifying the IoT device from a device having the address conversion function to identify the IoT device and control connection availability to a trunk network for each device.

The representative one of inventions disclosed in this application is outlined as follows. There is provided a network system that transfers data, the network system comprising: a first network; a second network connected with the first network and to which a server is connected; a third network connected with the first network and in which a terminal having address information different from address information of the first network is accommodated; a terminal identification device that determines connection availability of the terminal to the second network; and a gateway device that converts address information attached to data transferred between the first network and the third network, wherein the gateway device is configured to convert the address information of the gateway device in the first network attached to the data transferred from the first network to the third network, into address information of the terminal in the third network, and convert the address information of the terminal in the third network attached to the data transferred from the third network to the first network, into the address information of the gateway device in the first network, and the terminal identification device is configured to hold terminal identification information in which the address information of the gateway device in the first network, an identifier of the terminal, and the connection availability of the terminal to the second network are associated with each other, determine the connection availability of the terminal to the second network based on the terminal identification information, and acquire the address information of the gateway device in the first network and the identifier of the terminal from the gateway device to register or update the terminal identification information.

According to an aspect of the present invention, connection availability to another network can be controlled for each IoT device under control of a gateway device. Problem to be solved, configuration and effects other than those described above will be made clear in the description of embodiments described below.

BRIEF DESCRIPTION OF THE DRAWINGS

FIG. 4 is a diagram illustrating a configuration example of a mobile router management table of the first embodiment.

FIG. 5 is a diagram illustrating a configuration example of a connection availability management table of the first embodiment.

FIG. 6 is a diagram illustrating a configuration example of an IoT device identification table of the first embodiment.

FIG. 7 is a diagram illustrating a configuration example of a routing table of the first embodiment.

FIG. 8 is diagram illustrating a configuration example of an ARP table of the first embodiment.

FIG. 9 is a diagram illustrating a configuration example of a NAPT table of the first embodiment.

DETAILED DESCRIPTION OF THE PREFERRED EMBODIMENTS

First Embodiment

Figure 1:
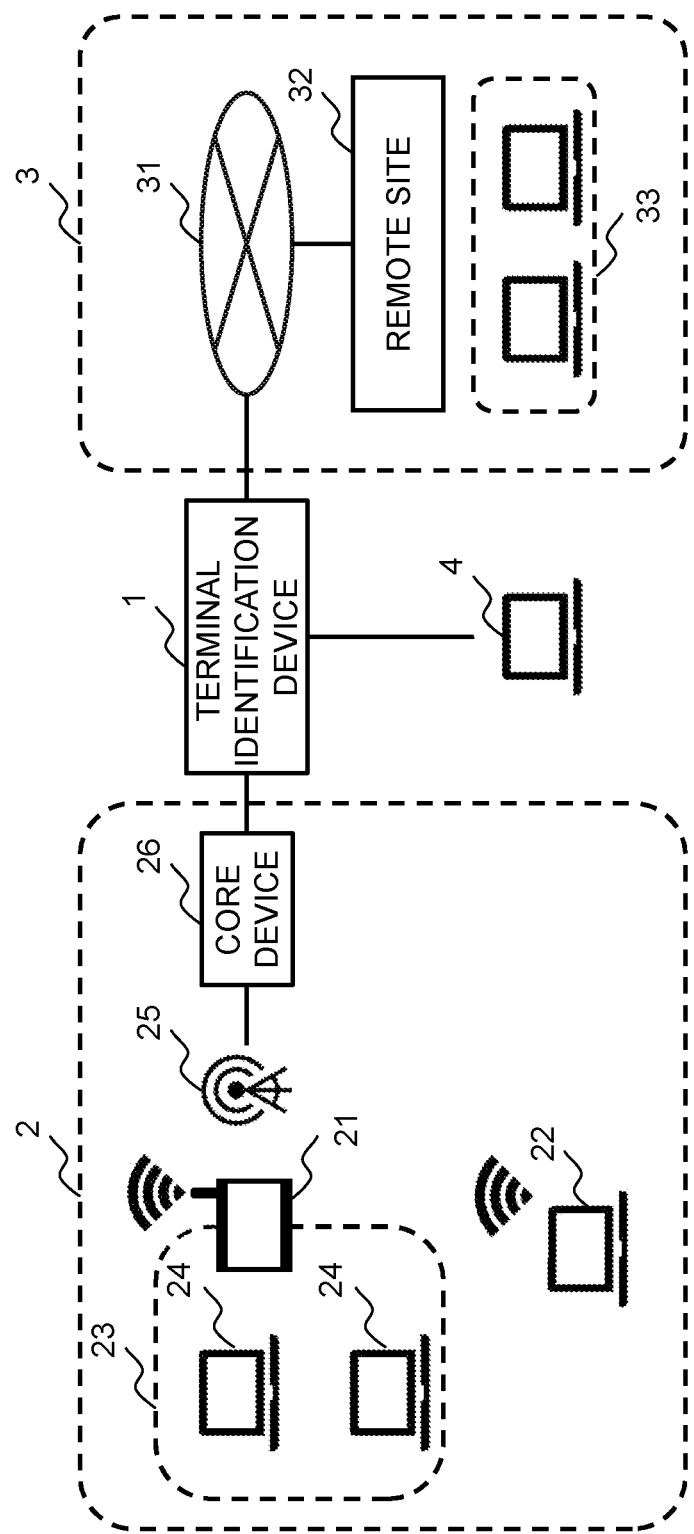
FIG. 1 is a diagram illustrating a configuration example of a network system of a first embodiment.

In the description below, the "memory" may be one or more memory devices as an example of one or more storage devices, and is typically a main storage device. At least one memory device in the memory may be a volatile memory device and may be a non-volatile memory device.

In the description below, the "non-transient storage device" may be one or more non-transient storage devices as an example of one or more storage devices. The non-transient storage device is typically a non-volatile storage device (for example, an auxiliary storage device). Specifically, the non-transient storage device may be a hard disk drive (HDD), a solid state drive (SSD), a non-volatile memory express (NVMe) drive, or a storage class memory (SCM), for example.

In the description below, the "storage device" may be either a memory or a non-transient storage device.

In the description below, the "processor" may be one or more processor devices. At least one processor device is typically a microprocessor device such as a central processing unit (CPU). However, at least one processor device may be a processor device of other type such as a graphics processing unit (GPU). At least one processor device may be of a single core or a multi-core. At least one processor device may be a processor core. At least one processor device may be a processor device in a broad sense such as a circuit as an aggregate of gate arrays that performs part or all of processing by a hardware description language (for example, a field-programmable gateway array (FPGA), a complex programmable logic device (CPLD), or an application specific integrated circuit (ASIC)).

In the description below, information in which an output can be obtained in response to an input is described with the expression "xxx table". The information may be data of any structure (for example, may be structured data and may be non-structured data), and may be a learning model represented by a neural network, genetic algorithm, and random forest in which an output is generated in response to an input. Accordingly, "xxx table" may be referred to as "xxx information". In the description below, a configuration of each table is an example. One table may be divided into two or more tables. All or part of two or more tables may be one table.

In the description below, a function is described with the expression "yyy unit". However, the function may be achieved by one or more computer programs being executed by a processor, may be achieved by one or more hardware circuits (for example, FPGA or ASIC), or may be achieved by a combination thereof. In a case where the function is achieved by a program being executed by a processor, determined processing is performed while using a storage device and/or a communication device as appropriate, and therefore, the function may be at least part of the processor. The processing described with a function as a subject may be processing performed by a processor or a device including the processor. The program may be installed from a program source. The program source may be, for example, a recording medium (for example, a non-transient recording medium) readable by a program distribution computer or a computer. Description of each function is an example and a plurality of functions may be collected as one function and one function may be divided into a plurality of functions.

FIG. 1 is a diagram illustrating a configuration example of a network system of a first embodiment.

A network system of the first embodiment illustrated in FIG. 1 includes a trunk network 3, a local 5G network 2, and a terminal identification device 1 installed between the trunk network 3 and the local 5G network 2. The terminal identification device 1 is only required to be installed at a position that a packet transferred between the trunk network 3 and the local 5G network 2 passes, the position being logically between the trunk network 3 and the local 5G network 2. The local 5G network 2 and the trunk network 3 are networks in which a packet is transferred by using an internet protocol (IP) in a layer 3 of an OSI model. The terminal identification device 1 identifies an IoT device 24 under control of a mobile router as a transmission source and an IoT device 22 not under control of the mobile router to control connection availability of the trunk network 3 on the basis of header information such as an IP address and a port number of a packet transferred from the local 5G network 2 to the trunk network 3. The IP address is an address used in a layer 3 of the OSI model, and the port number is identification information used in a layer 4 of the OSI model. A setting terminal 4 is connected to the terminal identification device 1. The setting terminal 4 receives a setting input by a network administrator, and registers a local 5G side IP (local 5G side IP 150) of the mobile router 21 used in the local 5G side network 2, in a mobile router management table 15 of the terminal identification device 1. The setting terminal 4 receives a setting input by the network administrator, and registers the IoT device 24 under control of a mobile router for which connection to the trunk network 3 is permitted and an identifier (IoT device identifier 160) such as an IP address and a MAC address of the IoT device 22 not under control of the mobile router, in a connection availability management table 16 of the terminal identification device 1. The configurations of the mobile router management table 15 and the connection availability management table 16 will be described later with reference to FIGS. 4 and 5.

The local 5G network 2 includes the mobile router 21, the IoT device 22 not under control of the mobile router, a LAN network 23 of the mobile router 21, the IoT device 24 under control of the mobile router, a base station device 25, and a mobile core device 26. The mobile router 21 and the IoT device 22 include an interface of the local 5G network 2, and are connected with the base station device 25 by a wireless line of the local 5G. The mobile core device 26 has a function of authenticating the mobile router 21 and the IoT device 22 on the basis of identification information (for example, IMSI) assigned to a mounted SIM card and performing assignment of the IP (local 5G side IP) used in the local 5G network 2, session management, traffic aggregation, and the like, to control the local 5G network 2. The mobile router 21 and the IoT device 22 are connected with the local 5G network 2 by using the local 5G side IP assigned by the mobile core device 26.

The mobile router 21 has an NAPT conversion function and converts a transmission source IP address and a transmission source port number of a packet transmitted from the IoT device 24 under control of the mobile router from an IP address and a port number of the IoT device 24 under control of the mobile router into an IP address and a port number of the mobile router 21. The IoT device 24 under control of the mobile router is connected to the LAN network 23 of the mobile router 21. By using the NAPT conversion function of the mobile router 21, the IoT device 24 under control of a plurality of mobile routers can be connected to the local 5G network 2 by using the local 5G side IP address of the mobile router 21.

The trunk network 3 includes a remote site 32 including a trunk network server 33 and an intranet 31. The intranet 31 is configured by, for example, the IP-VPN or wide area ethernet, and connects the local 5G network 2 and a plurality of remote sites 32. The remote site 32 is a site in which a network that is connected with the intranet 31 is laid, and the trunk network server 33 is a server that is connected with the trunk network 3. For example, there is a data center as the remote site 32, and an execution server of a production management system as the trunk network server 33.

Figure 2:
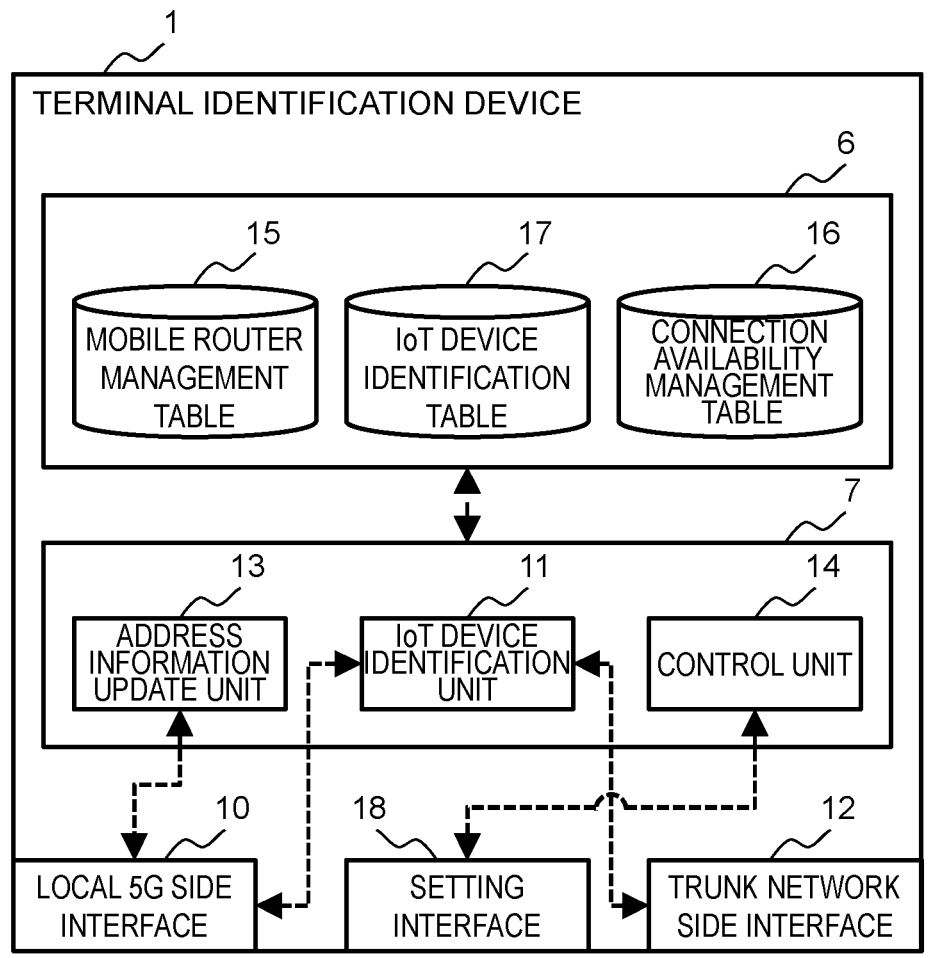
FIG. 2 is a diagram illustrating a configuration example of a terminal identification device of the first embodiment.

FIG. 2 is a diagram illustrating a configuration example of the terminal identification device 1 of the first embodiment.

The terminal identification device 1 of the first embodiment includes a plurality of types of physical hardware resources such as a local 5G side interface 10, an IoT device identification unit 11, a trunk network side interface 12, a storage device 6, and a processor 7 connected to the components.

Data is transmitted and received through the interfaces 10, 12, and 18. The storage device 6 stores the mobile router management table 15, the connection availability management table 16, and the IoT device identification table 17. These tables 15, 16, and 17 are tables in which the terminal identification device 1 stores and deletes information. By the processor 7 executing a program in the storage device 6, an address information update unit 13, an IoT device identification unit 11, and a control unit 14 are achieved. The processor 7 includes one or a plurality of operation devices such as CPU cores, and executes a predetermined program.

The local 5G side interface 10 is an interface that connects the terminal identification device 1 to the local 5G network 2. The trunk network side interface 12 is an interface that connects the terminal identification device 1 to the trunk network 3. The setting interface 18 is an interface that connects the terminal identification device 1 to the setting terminal 4.

The IoT device identification table 17 holds address information such as IP addresses and port numbers for identifying the IoT device 24 under control of the mobile router and the IoT device 22 not under control of the mobile router, identifiers for identifying the IoT devices 22, 24, and information on connection availability to the trunk network 3. The IoT device identification table 17 is registered by the address information update processing by the terminal identification device 1. The configuration of the IoT device identification table 17 is described later with reference to FIG. 6. The IoT device identification unit 11 searches for address information such as an IP address and a port number of the IoT device identification table 17, the address information being header information such as a transmission source IP address and a transmission source port number of a packet transferred from the local 5G network 2 to the trunk network 3, to identify the IoT device 24 under control of the mobile router and the IoT device 22 not under control of the mobile router that are the transmission sources. In a case where the IoT device 24 of under control of the mobile router and the IoT device 22 not under control of the mobile router can be connected to the trunk network 3, the IoT device identification unit 11 transfers the packet to the trunk network server 33. In a case where the IoT device 24 under control of the mobile router and the IoT device 22 not under control of the mobile router cannot be connected to the trunk network 3, the IoT device identification unit 11 discards the packet. The packet transferred from the trunk network 3 to the local 5G network 2 is subjected to header processing and is transferred to the local 5G network 2.

The mobile router management table 15 holds information for managing the mobile router 21 used in the local 5G network 2. The connection availability management table 16 holds information for controlling the connection availability of the IoT device 24 under control of the mobile router and the IoT device 22 not under control of the mobile router to the trunk network 3. The mobile router management table 15 and the connection availability management table 16 are set from the setting terminal 4 on the basis of a setting input by the network administrator through the user interface (see FIG. 10). The configurations of the mobile router management table 15 and the connection availability management table 16 will be described later with reference to FIGS. 4 and 5. The address information update unit 13 refers to the mobile router management table 15, requests the mobile router 21 for an NAPT table 217 and an ARP table 216, creates association between the identifier of the IoT device 24 under control of the mobile router and the address information (IP address and port number) from the acquired tables, and updates the IoT device identification table 17. The association between the identifier of the IoT device 24 under control of the mobile router and the address information (IP address and port number) may be created by receiving the NAPT table 217 and the ARP table 216 by the terminal identification device 1, and may be created by the mobile router 21 and transmitted to the terminal identification device 1.

The control unit 14 receives the setting input from the setting terminal 4, and controls operation of the terminal identification device 1, for example, controls data registration to the mobile router management table 15, the connection availability management table 16, and the IoT device identification table 17.

Figure 3:
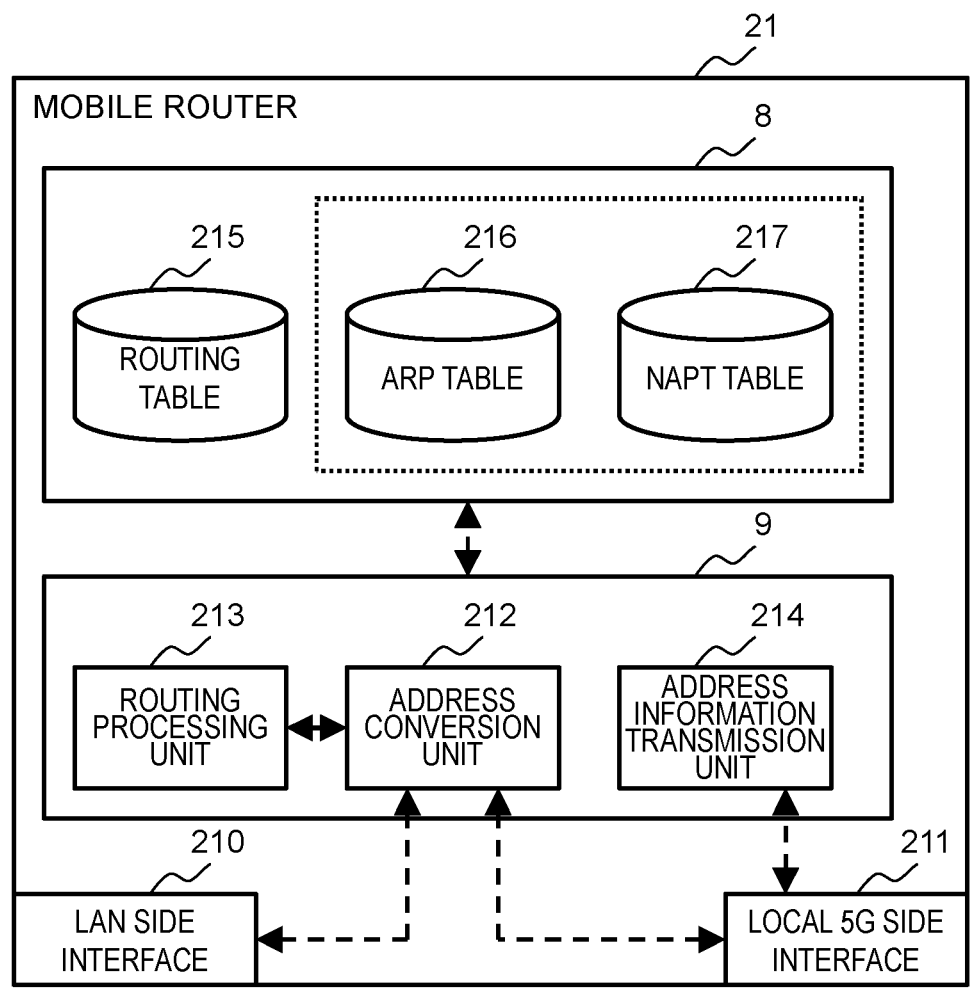
FIG. 3 is a diagram illustrating a configuration example of a mobile router of the first embodiment.

FIG. 3 is a diagram illustrating a configuration example of the mobile router 21 of the first embodiment.

The mobile router 21 is a gateway device including a plurality of types of physical hardware resources such as a LAN side interface 210, a local 5G side interface 211, a mobile router storage device 8, and a mobile router processor 9 connected to those components.

Data is transmitted and received through the interfaces 210, 211. The mobile router storage device 8 stores a routing table 215, the ARP table 216, and the NAPT table 217. These tables 215, 216, and 217 are tables in which information is stored and from which information is deleted by the mobile router 21. By the mobile router processor 9 executing a program in the mobile router storage device 8, the routing processing unit 213, the address conversion unit 212, and the address information transmission unit 214 are achieved. The mobile router processor 9 includes one or more CPU cores and executes a predetermined program.

The LAN side interface 210 is an interface that connects the mobile router 21 to the LAN network 23. The local 5G side interface 211 is an interface that connects the mobile router 21 to the local 5G network 2. The local 5G side interface 211 decides whether the destination of the reception packet is the mobile router 21. In a case where the destination of the reception packet is the mobile router 21, the local 5G side interface 211 performs reception processing. In a case where the destination is not the mobile router 21, the local 5G side interface 211 transfers the packet to the address conversion unit 212. For example, a request message of the ARP table 216 and the NAPT table 217 to the mobile router 21 is transferred by the packet whose destination is the terminal identification device 1.

The ARP table 216 holds an IP address 2160 and a MAC address 2161 of the IoT device 24 under control of the mobile router and the trunk network server 33 in association with an output destination interface 2162. For example, the ARP table 216 is registered by ARP protocol processing of associating the IP address with the MAC in response to that the address conversion unit 212 requests the IP address for the MAC address of the IP address. The routing table 215 holds a destination network address 2150 of a packet transferred between the LAN network 23 and the local 5G network 2, a next hop terminal IP address 2151, and an output destination interface 2152 of the packet in association with each other.

For example, the routing table 215 is registered by OSPF routing protocol processing performed by the routing processing unit 213. The routing processing unit 213 searches for the destination network address 2150 of the routing table 215 by using the destination IP address of the packet transferred from the address conversion unit 212, and determines the next hop terminal IP address 2151 and the output destination interface 2152 of a matching entry.

The routing processing unit 213 performs a search in the ARP table 216 by using the IP address of the next hop terminal, rewrites the destination MAC address of the packet with the MAC address 2161 of the matching entry, and outputs the packet from the determined output destination interface. In a case where there is no matching entry, the routing processing unit 213 transmits an ARP request to the IP address of the next hop terminal from the output destination interface, and waits for reception of an ARP reply in the output destination interface 2152. After reception, the routing processing unit 213 acquires the MAC of the next hop terminal from the ARP reply, records the MAC in the MAC address 2161 of the ARP table 216, then rewrites the destination MAC address of the packet to the MAC address of the next hop terminal, and transmits the packet from the output destination interface 2152. The configurations of the ARP table 216 and the routing table 215 will be described later with reference to FIGS. 7 and 8.

The NAPT table 217 holds the IP address (local 5G side IP address 2170) and the port number (local 5G side port number 2171) of the mobile router 21 in association with the IP address (LAN side IP address 2172) and the port number (LAN side port number 2173) of the IoT device 24 under control of the mobile router. The NAPT table 217 is registered by the address conversion unit 212 performing address conversion processing, for example. The configuration of the NAPT table 217 will be described later with reference to FIG. 9.

The address conversion unit 212 searches for the LAN side IP address 2172 and the LAN side port number 2173 in the NAPT table 217 by using the transmission source IP address and the transmission source port number of the packet transferred from the LAN network 23 to the local 5G network 2, and rewrites the transmission source IP address and the port number of the packet with the local 5G side IP address 2170 and the local 5G side port number 2171 of a matching entry.

The address conversion unit 212 searches for the local 5G side IP address 2170 and the local 5G side port number 2171 in the NAPT table 217 by using the transmission source IP address and the transmission source port number of the packet transferred from the local 5G network to the LAN network 23, and rewrites the transmission source IP address and port number of the packet with the LAN side IP address 2172 and the LAN side port number 2173 of a matching entry. As a result, the address information of the LAN network 23 and the address information of the local 5G network 2 included in the packet transferred between the LAN network 23 and the local network 2 are converted to each other.

The address information transmission unit 214 acquires the ARP table 216 and the NAPT table 217 held by the mobile router 21 in response to that the local 5G side interface 211 receives a request message of the ARP table 216 and the NAPT table 217 from the terminal identification device 1, and transmits the ARP table 216 and the NAPT table 217 from the local 5G side interface 211 to the terminal identification device 1.

FIG. 4 is a diagram illustrating a configuration example of the mobile router management table 15 of the first embodiment.

The mobile router management table 15 holds the local 5G side IP address 150 of the mobile router 21 used in the local 5G network 2.

FIG. 5 is a diagram illustrating a configuration example of the connection availability management table 16 of the first embodiment.

The connection availability management table 16 holds the IoT device identifier 160 that is an identifier of the IoT device 24 under control of the mobile router and the IoT device 22 not under control of the mobile router for which connection to the trunk network 3 is permitted. The IoT device identifier 160 may be either the IP address and the MAC address. The IoT device identifier 160 registered in the connection availability management table 16 is preferably the MAC address, but may be a unique identifier assigned by the administrator.

FIG. 6 is a diagram illustrating a configuration example of the IoT device identification table 17 of the first embodiment.

The IoT device identification table 17 holds the local 5G side IP address 170 of the mobile router 21 or the IoT device 22, the port number (mobile router port number 171) used by the mobile router 21, the identifier (IoT device identifier 172) of the IoT device 24 under control of the mobile router and the IoT device 22 not under control of the mobile router, and the connection availability 173 to the trunk network 3 in association with each other. The local 5G side IP address 170 is an IP address of the IoT device 22 in a case of the IoT device 22 not under control of the mobile router, and is an IP address of the mobile router 21 in a case of the IoT device 24 under control of the mobile router. The mobile router port number 171 is set to a different value for each IoT device 24, and is used for identifying the IoT device 24 under control of the mobile router. The IoT device identifier 172 is preferably the MAC address, but may be a unique identifier assigned by the administrator, and the same identifier as the IoT device identifier 160 of the connection availability management table 16 is used as the IoT device identifier 172.

FIG. 7 is a diagram illustrating a configuration example of the routing table 215 of the first embodiment.

The routing table 215 holds the destination network address 2150 of the packet transferred between the LAN network 23 and the local 5G network 2, the next hop terminal IP address 2151 that is the IP address of the transfer destination of the packet, and the output destination interface 2152 that is the interface to which the packet is output, in association with each other.

FIG. 8 is diagram illustrating a configuration example of the ARP table 216 of the first embodiment.

The ARP table 216 holds the destination IP address and the destination MAC address of the packet transferred between the LAN network 23 and the local 5G network 2 in association with each other.

FIG. 9 is a diagram illustrating a configuration example of the NAPT table 217 of the first embodiment.

The NAPT table 217 holds the local 5G side IP address 2170, the local 5G side port number 2171, the LAN side IP address 2172, and the LAN side port number 2173 in association with each other.

Figure 10:
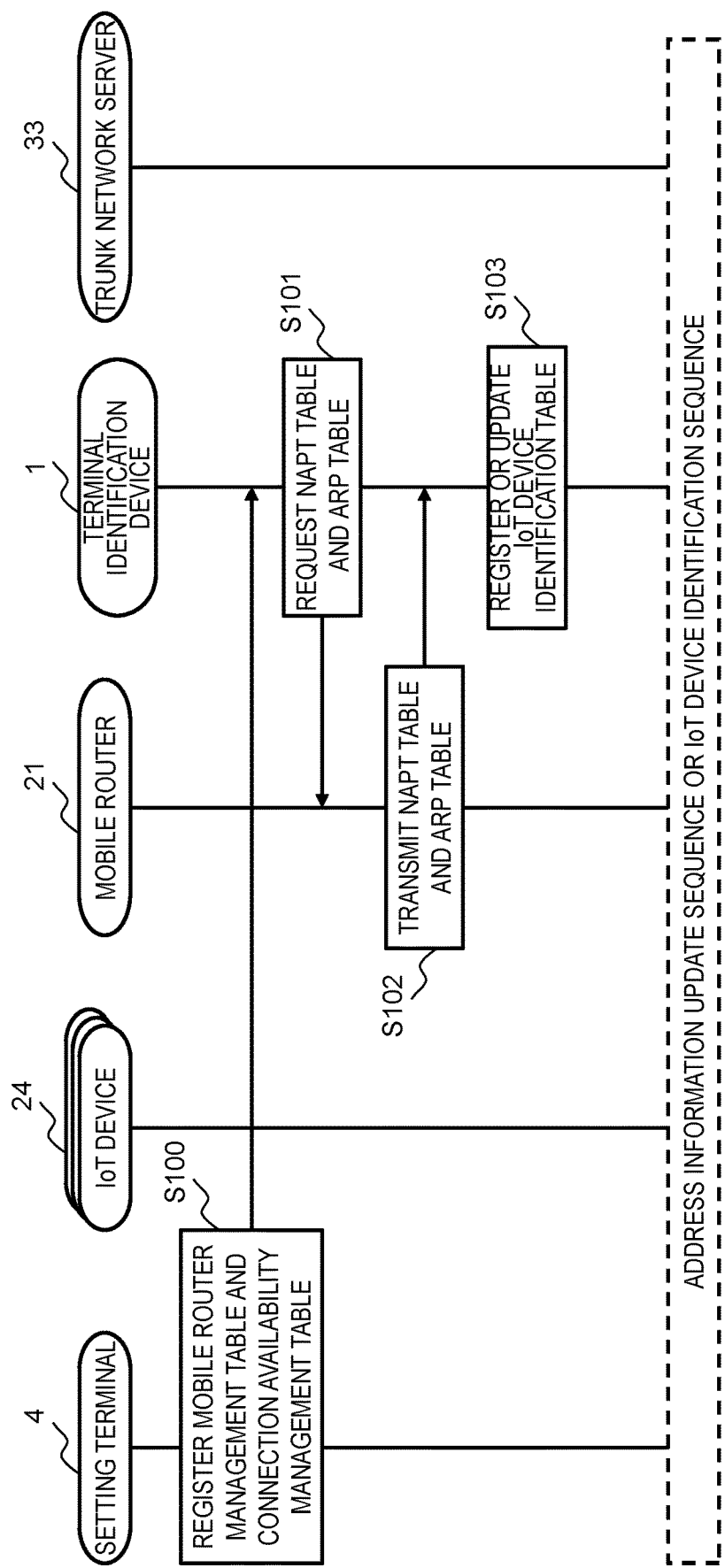
FIG. 10 is a sequence diagram of an example of an address information update processing for the IoT device under control of the mobile router.
Figure 11:
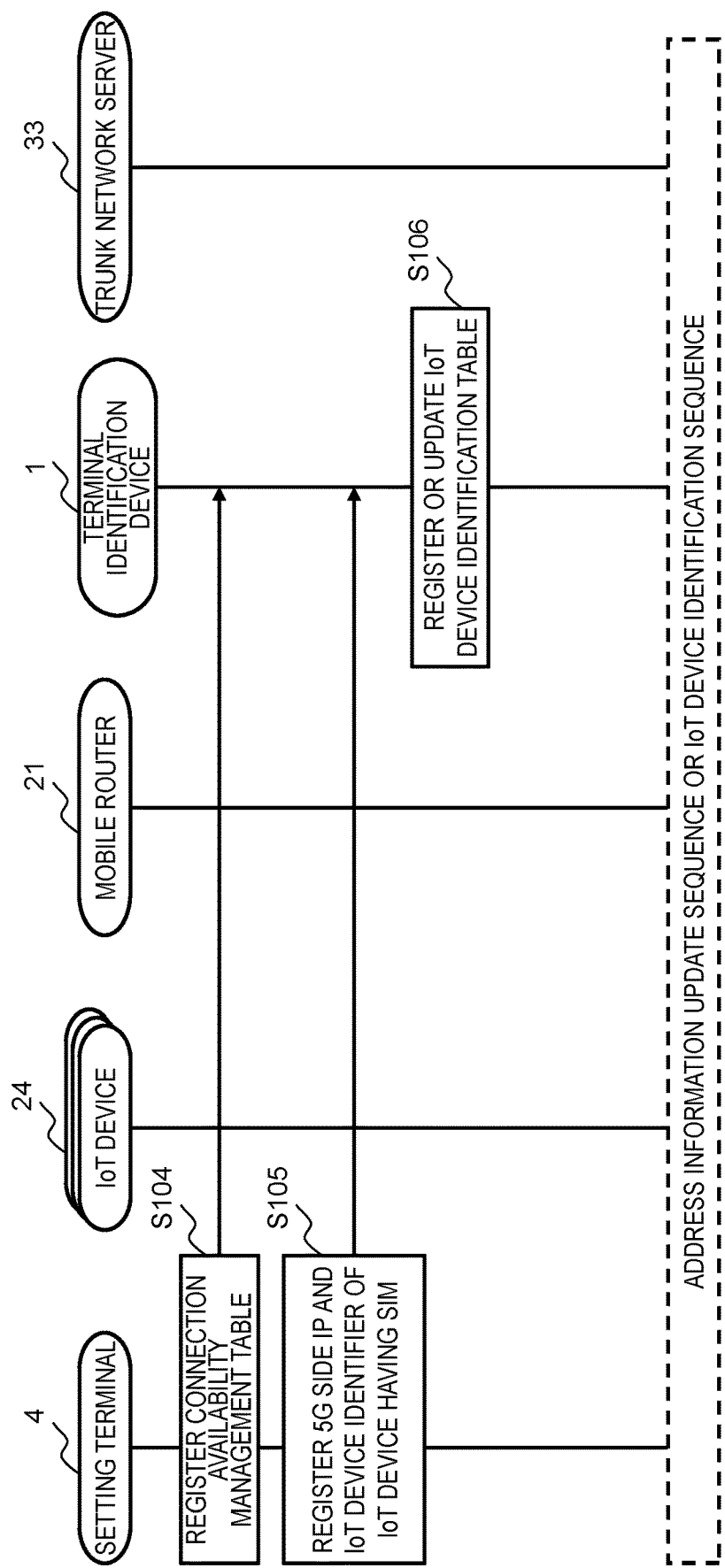
FIG. 11 is a sequence diagram of an example of an address information update processing for the IoT device not under control of the mobile router.

FIGS. 10 and 11 are diagrams illustrating an example of a sequence of the address information update processing of the first embodiment. In the address information update processing, a combination is registered in the IoT device identification table 17, the combination being a combination of the connection availability and the address information such as the IP address and the port number of the IoT device 24 under control of the mobile router and the IoT device 22 not under control of the mobile router so that execution of the IoT device identification processing that requires reference to the IoT device identification table 17 is enabled. The sequence of the address information processing is performed by the control unit 14 of the terminal identification device 1 in response to the operation of the execution button 414 of the user interface 40 (see FIG. 15) of the setting terminal 4, the time interval specified by a periodic execution interval 415, and in a case where the IoT device under control of the mobile router cannot be identified in the IoT device identification sequence (S204 of FIG. 16).

FIG. 10 is a sequence diagram of an example of the address information update processing for the IoT device 24 under control of the mobile router.

First, the setting terminal 4 receives a setting input by the network administrator, and registers the IP address of the mobile router 21 used in the local 5G network 2 in the local 5G side IP address 150 of the mobile router management table 15. The setting terminal 4 receives a setting input by the network administrator, and registers the identifier of the IoT device 24 under control of the mobile router for which connection to the trunk network 3 is permitted in the IoT device identifier 160 of the connection availability management table 16 (S100).

Next, the address information update unit 13 of the terminal identification device 1 transmits a request message of the ARP table 216 and the NPAT table 217 from the local 5G side interface 10 to the mobile router 21 by using the local 5G side IP address 150 of the mobile router management table 15 as the destination IP address (S101).

The address information transmission unit 214 of the mobile router 21 receives the request message of the ARP table 216 and the NAPT table 217 from the local 5G side interface 211. After receiving the request message, the address information transmission unit 214 acquires the ARP table 216 and the NAPT table 217 held by the mobile router 21, and transmits the ARP table 216 and the NAPT table 217 from the local 5G side interface 211 to the terminal identification device 1 (S102). In step S102, the ARP table 216 and the NAPT table 217 may be transmitted as it is, or data of a set including the local 5G side IP address of the mobile router 21, the port number used by the mobile router 21, and the identifier of the IoT device 24 under control of the mobile router may be transmitted. It is preferable that the processing adopted from among these is changed according to the processing capacity and surplus resource amount of the mobile router 21 and the terminal identification device 1.

The address information update unit 13 of the terminal identification device 1 receives the ARP table 216 and the NAPT table 217 from the local 5G side interface 10. In the NAPT table 217, the IP address of the IoT device 24 under control of the mobile router, the port number of the IoT device 24 under control of the mobile router, the IP address of the mobile router 21, and the port number of the mobile router 21 are registered respectively as the local 5G side IP address 2170, the local 5G side port number 2171, the LAN side IP address 2172, and the LAN side port number 2173. In the ARP table 216, the IP address of the IoT device 24 under control of the mobile router and the MAC of the IoT device 24 under control of the mobile router are registered respectively as the IP address 2160 and the MAC 2161.

Accordingly, after the ARP table 216 and the NAPT table 217 are received, the local 5G side IP address 2170 of the NAPT table 217 corresponding to the IP address 2160 of the ARP table 216, the local 5G side port number 2171, and the MAC 2161 of the ARP table 216 are registered respectively as the local 5G side IP address 170, the mobile router port number 171, and the IoT device identifier 172 in the IoT device identification table 17.

At this time, in a case where there is an entry matching the local 5G side IP address 170 in the IoT device identification table 17, the entry is updated. In a case where a search for the IoT device identifier 172 of the IoT device identification table 17 is performed by using the IoT device identifier 160 of the connection availability management table 16 and there is a matching entry, the address information update unit 13 updates the entry so as to set the connection availability 173 to available, and in a case where there is no matching entry, the address information update unit 13 updates the entry so as to set the connection availability 173 to unavailable (S103).

FIG. 11 is a sequence diagram of an example of the address information update processing for the IoT device 22 not under control of the mobile router.

First, the setting terminal 4 receives a setting input from the network administrator, and registers the identifier of the IoT device 22 for which connection to trunk network 3 is permitted, in the IoT device identifier 160 of the connection availability management table 16 (S104).

The setting terminal 4 receives a setting input by the network administrator, and registers the local 5G side IP address and the identifier of the IoT device 22 in the local 5G side IP address 170 and the IoT device identifier 172 of the IoT device identification table 17 (S105).

The address information update unit 13 of the terminal identification device 1 searches for the IoT device identifier 172 of the IoT device identification table 17 by using the IoT device identifier 160 of the connection availability management table 16, and updates the entry so as to set the connection availability 173 to available in a case where there is a matching entry and unavailable in a case where there is no matching entry (S106).

Figure 12:
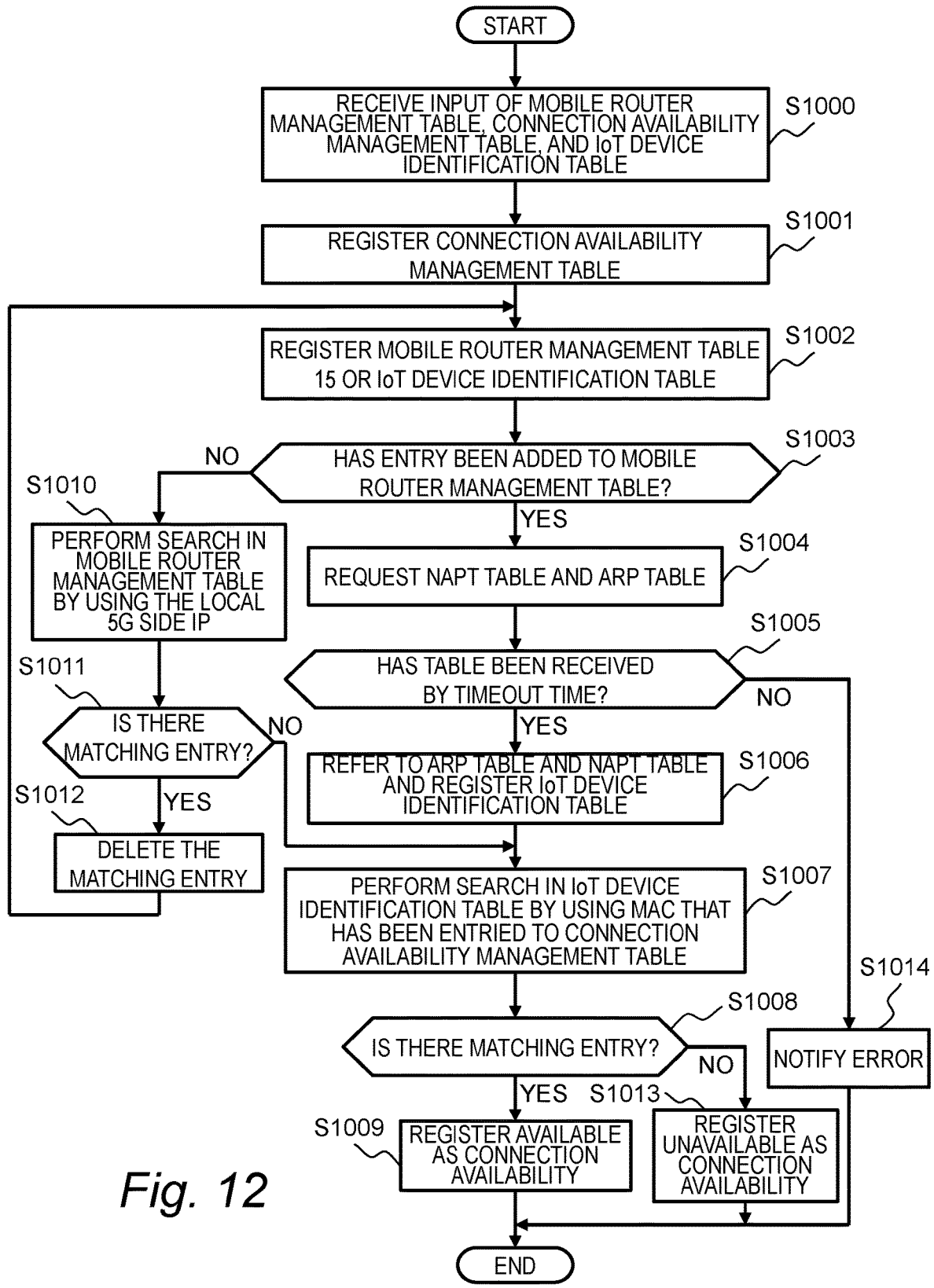
FIG. 12 is a flowchart of an example of the address information update processing of the first embodiment.

FIG. 12 is a flowchart of an example of the address information update processing of the first embodiment.

Figure 13:
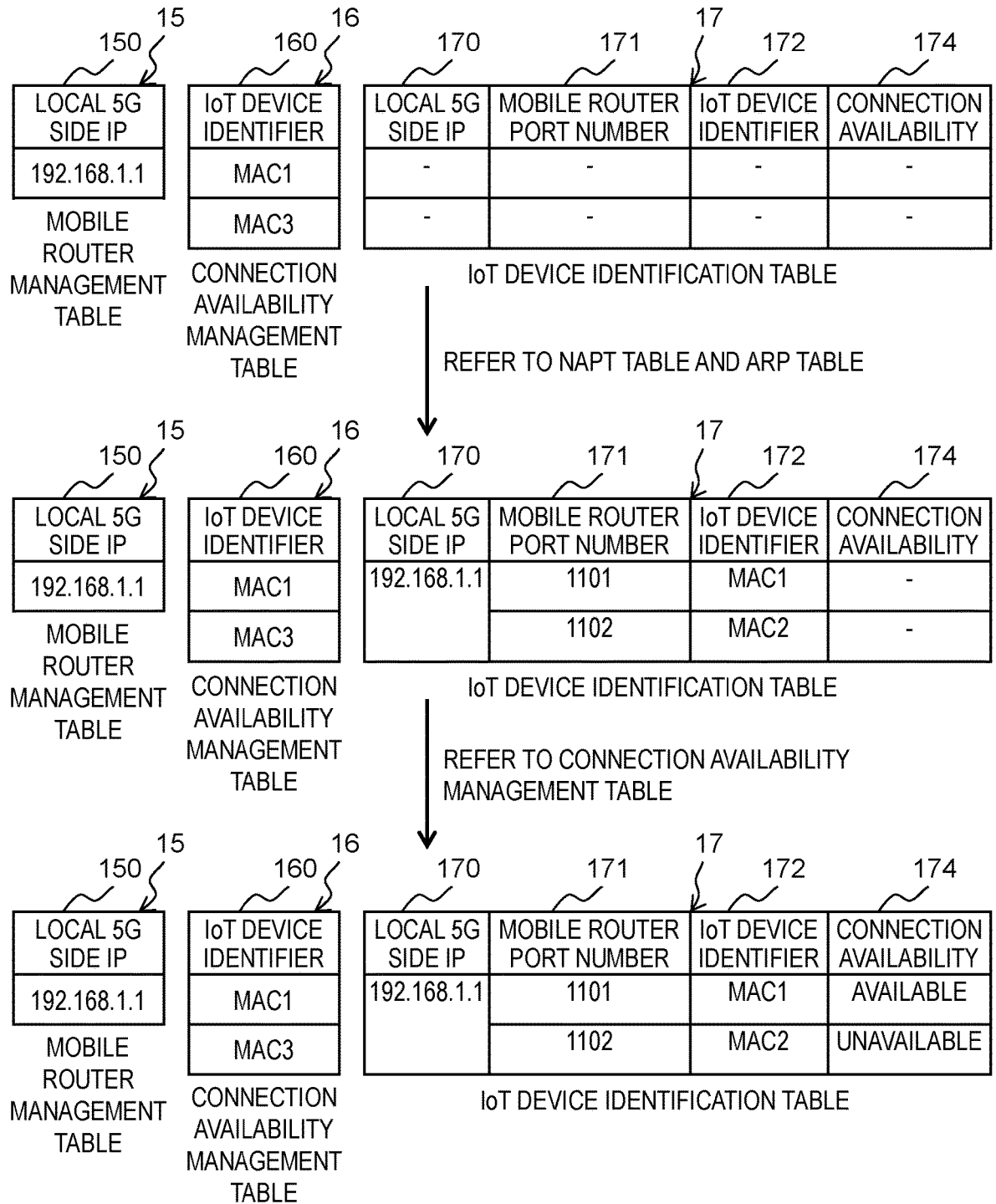
FIG. 13 is a diagram illustrating a change in the mobile router management table, the connection availability management table, and the IoT device identification table in a case where the address information update processing is performed for the IoT device under control of the mobile router.

A case where the address information update processing is performed on the IoT device 24 under control of the mobile router will be described below. FIG. 13 is a diagram illustrating a change in the mobile router management table 16, the connection availability management table 16, and the IoT device identification table 17 in a case where the address information update processing is performed for the IoT device 24 under control of the mobile router.

First, the control unit 14 of the terminal identification device 1 receives registration of the mobile router management table 15, the connection availability management table 16, the IoT device identification table 17 from the setting terminal 4 (S1000). The setting terminal 4 receives the setting input by the network administrator and registers the identifier of the IoT device 24 under control of the mobile router in the IoT device identifier 160 of the connection availability management table 16 (S1001). The setting terminal 4 receives the setting input by the network administrator and registers the IP address of the mobile router 21 in the local 5G side IP address 150 of the mobile router management table 15 (S1002).

At the time of the end of step S1002, as illustrated in the upper part in FIG. 13, the IP address of the mobile router 21 is registered in the local 5G side IP address 150 of the mobile router management table 15 and the identifier of the IoT device 24 under control of the mobile router is registered in the IoT device identifier 160 of the connection availability management table 16.

Next, the control unit 14 of the terminal identification device 1 decides whether an entry has been added to the mobile router management table 15 or an entry has been added to the IoT device identification table 17 in step S1002 (S1003).

In a case where address information update processing is performed on the IoT device 24 under control of the mobile router, an entry is added to the mobile router management table 15 (Yes in S1003), the address information update unit 13 of the terminal identification device 1 transmits the request message of the ARP table 216 and the NAPT table 217 from the local 5G side interface 10 to the mobile router 21 by using the local 5G side IP address 150 of the mobile router management table 15 as the destination IP address (S1004).

The address information update unit 13 of the terminal identification device 1 decides whether the ARP table 216 and the NAPT table 217 can be received within a timeout time set from the setting terminal 4 (S1005).

In a case where the ARP table 216 and the NAPT table 217 are received within the timeout time (Yes in S1005), after receiving the ARP table 216 and the NAPT table 217, the address information update unit 13 registers the local 5G side IP address 2170 of the NAPT table 217 corresponding to the IP address 2160 of the ARP table 216, the local 5G side port number 2171, and the MAC 2161 of the ARP table 216, respectively as the local 5G side IP address 170, the mobile router port number 171, and the IoT device identifier 172 of the IoT device identification table 17. At this time, in a case where there is a matching entry with the local 5G side IP address 170 in the IoT device identification table 17, the address information update unit 13 updates the entry (S1006). In a case where the ARP table 216 and the NAPT table 217 are not received within the timeout time (No in S1005), the address information update unit 13 notifies the setting terminal 4 of an error (S1014).

At the time of the end of step S1014, as illustrated in the middle part of FIG. 13, in the IoT device identification table 17, the IP address of the mobile router 21, the port number of the mobile router 21, and the identifier of the IoT device 24 under control of the mobile router are registered respectively as the local 5G side IP address 170, the mobile router port number 171, and the IoT device identifier 172.

Next, the control unit 14 of the terminal identification device 1 searches for the IoT device identifier 172 of the IoT device identification table 17 by using the IoT device identifier 160 of the connection availability management table 16 (S1007) and decides whether there is a matching entry (S1008). In a case where there is a matching entry (Yes in S1008), the control unit 14 updates the entry so as to set the connection availability 173 of the entry to available (S1009). In a case where there is no matching entry (No in S1008), the control unit 14 updates the entry so as to set the connection availability 173 of the entry to unavailable (S1013).

At the time of the end of step S1013, as illustrated in the lower part of FIG. 13, in the IoT device identification table 17, the IP address of the mobile router 21, the port number of the mobile router 21, the identifier of the IoT device 24 under control of the mobile router, and the connection availability of the IoT device 24 under control of the mobile router are registered respectively as the local 5G side IP address 170, the mobile router port number 171, the IoT device identifier 172, and the connection availability 173.

The address information update processing ends by the above processes, and the terminal identification device 1 can start the IoT device identification sequence (see FIG. 16) for the IoT device 24 under control of the mobile router.

Figure 14:
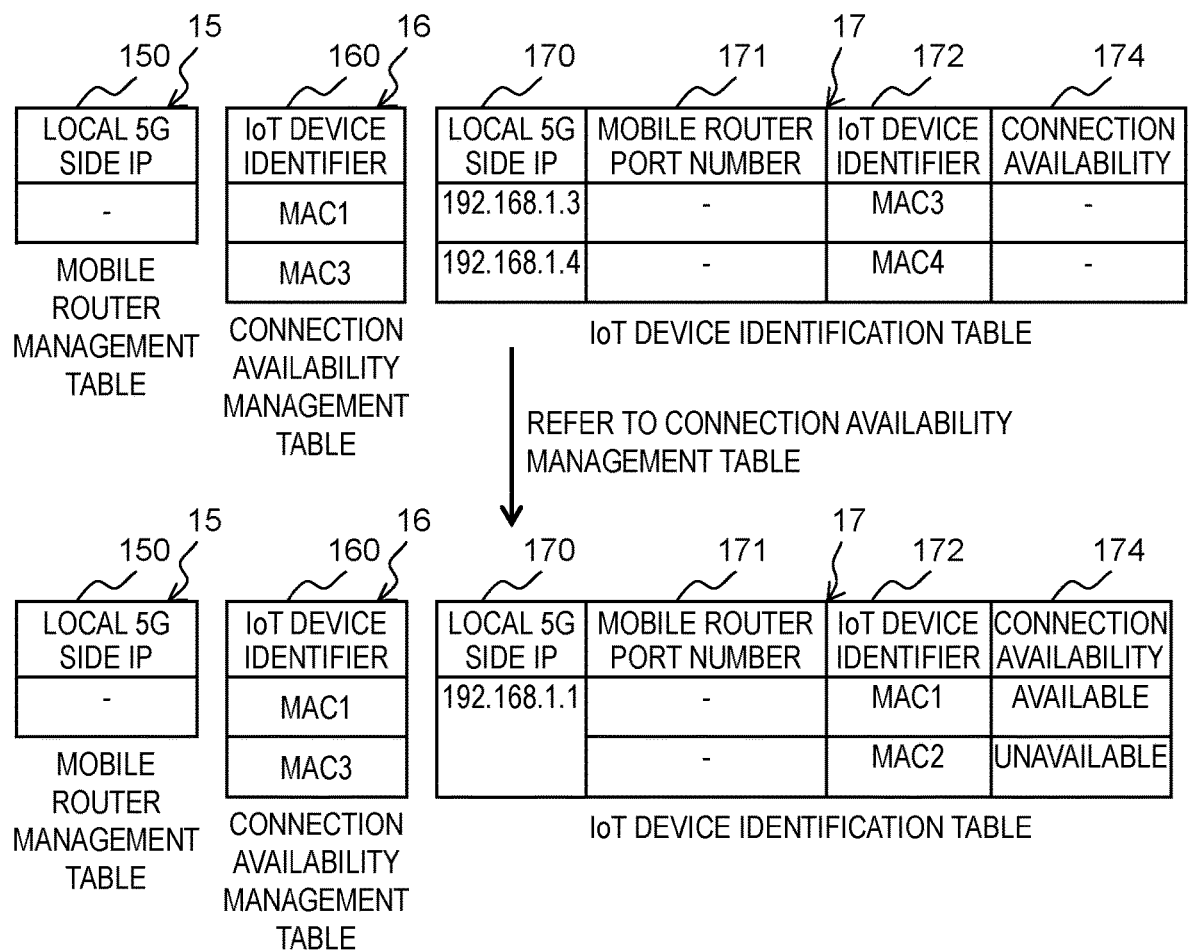
FIG. 14 is a diagram illustrating a change in the mobile router management table, the connection availability management table, and the IoT device identification table in a case where the address information update processing is performed for the IoT device.

Next, a case where the address information update processing is performed for the IoT device 22 not under control of the mobile router will be described below. FIG. 14 is a diagram illustrating a change in the mobile router management table 15, the connection availability management table 16, and the IoT device identification table 17 in a case where the address information update processing is performed for the IoT device 22.

First, the control unit 14 of the terminal identification device 1 receives registration of the mobile router management table 15, the connection availability management table 16, the IoT device identification table 17 from the setting terminal 4 (S1000). The setting terminal 4 receives a setting input by the network administrator and registers the identifier of the IoT device 22 in the IoT device identifier 160 of the connection availability management table 16 (S1001). The setting terminal 4 receives a setting input by the network administrator and registers the IP address and the identifier of the IoT device 22 in the local 5G side IP address 170 and the IoT device identifier 172 of the IoT device identification table 17 (S1002).

At the time of the end of step S1002, as illustrated in the upper part of FIG. 14, the identifier of the IoT device 22 is registered in the IoT device identifier 160 of the connection availability management table 16. In addition, the IP address and the identifier of the IoT device 22 are registered in the local 5G side IP address 170 and the IoT device identifier 172 of the IoT device identification table 17.

Next, the control unit 14 of the terminal identification device 1 decides whether an entry has been added to the mobile router management table 15 in step S1002 or whether an entry has been added to the IoT device identification table 17 (S1003).

In a case where the address information update processing is performed for the IoT device 22, since an entry is added to the IoT device identification table 17 (No in S1003), the control unit 14 searches for the local 5G side IP address 150 (S1010) of the mobile router management table 15 by using the local 5G side IP address 170 of the entry (S1010), and decides whether there is a matching entry (S1011).

In a case where there is a matching entry (Yes in S1011), the control unit 14 deletes an entry including the local 5G side IP address 170 and the IoT device identifier 172 of the IoT device 22 that have been registered in the IoT device identification table 17 in step S1002 (S1012) and the process returns to step S1002.

In a case where there is no entry (No in S1011), the control unit 14 of the terminal identification device 14 searches for the IoT device identifier 172 of the IoT device identification table 17 by using the IoT device identifier 160 of the connection availability management table 16 (S1007) and decides whether there is a matching entry (S1008). In a case where there is a matching entry (Yes in S1008), the control unit 14 updates the entry so as to set the connection availability 173 of the entry to available (S1009). In a case where there is no matching entry (No in S1008), the control unit 14 updates the entry so as to set the connection availability 173 of the entry to unavailable (S1013).

At the time of the end of step S1013, as illustrated in the lower part of FIG. 14, in the IoT device identification table 17, the IP address of the mobile router 21, the identifier of the IoT device 24 under control of the mobile router, and the connection availability of the IoT device 24 under control of the mobile router are registered respectively as the local 5G side IP address 170, the IoT device identifier 172, and the connection availability 173.

The address information update processing ends by the above processes, and the terminal identification device 1 can start the IoT device identification sequence (see FIG. 16) for the IoT device 22.

Figure 15A:
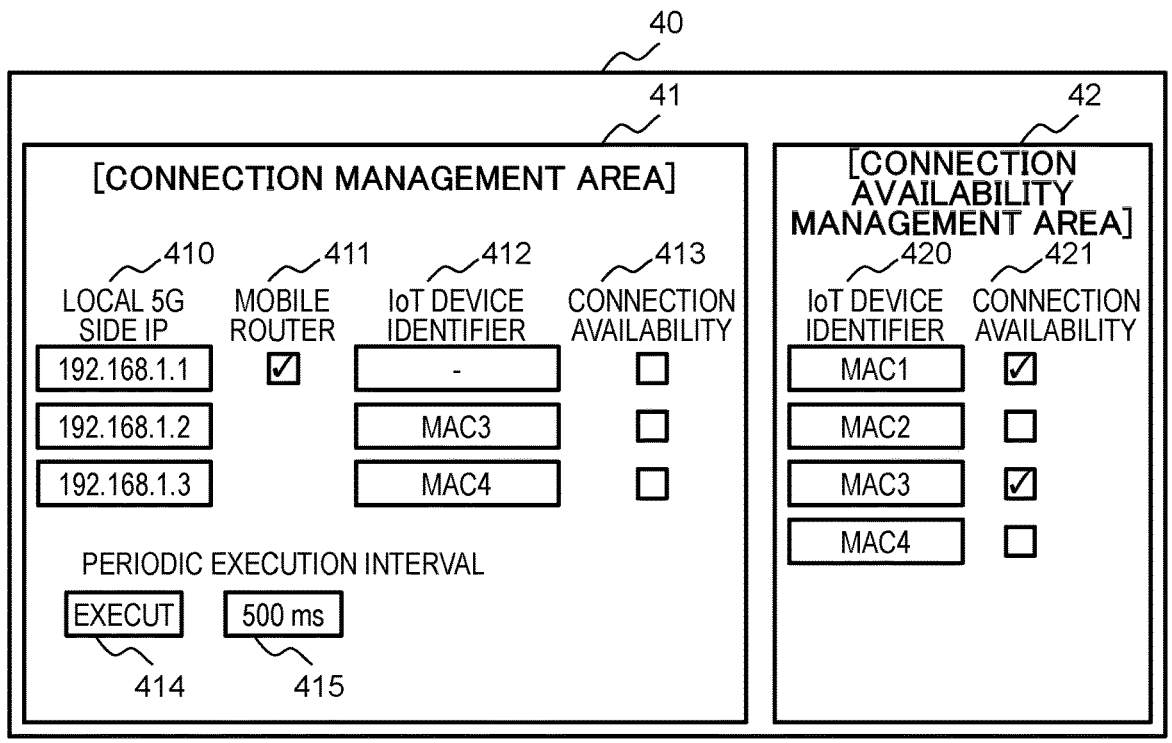
FIGS. 15A and 15B are diagrams illustrating an example of a user interface user in the address information update processing of the first embodiment.
Figure 15B:
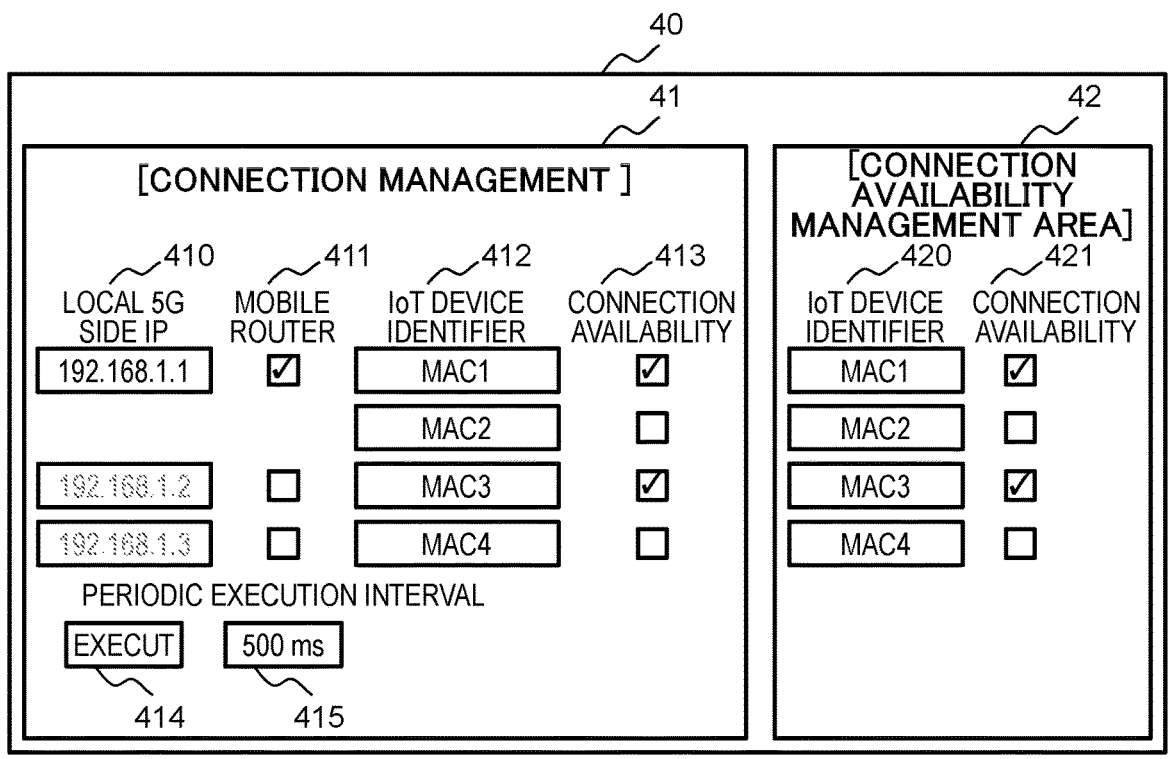

FIGS. 15A and 15B are diagrams illustrating an example of the user interface user in the address information update processing of the first embodiment.

As illustrated in FIG. 15A, before execution of the address information update processing, the local 5G side IP address 150 of the mobile router management table 15 is input to a local 5G side IP address column 410, and a check is input to a corresponding mobile router check column 411. A combination of the local 5G side IP address 170 and the IoT device identifier 172 of the IoT device 22 is input to a combination of the local 5G side IP address column 410 and the IoT device identifier column 412 of a connection management area 41. A combination of the IoT device 24 under control of the mobile router of the connection availability management table 16 and the IoT device identifier 160 of the IoT device 22 not under control of the mobile router is input to a combination of a IoT device identifier column 420 and a connection availability column 421 of a connection availability management area 42. The address information update processing is performed in response to an operation of an execution button 414 of the connection management area 41 or a timing set in a periodic execution interval 415.

As illustrated in FIG. 15B, after execution of the address information update processing, the local 5G side IP address 170, the IoT device identifier 172, and the connection availability 173 of the IoT device identification table 17 are respectively displayed on the local 5G side IP address column 410, the IoT device identifier column 412, and a connection availability column 413 of the connection management area 41.

Figure 16:
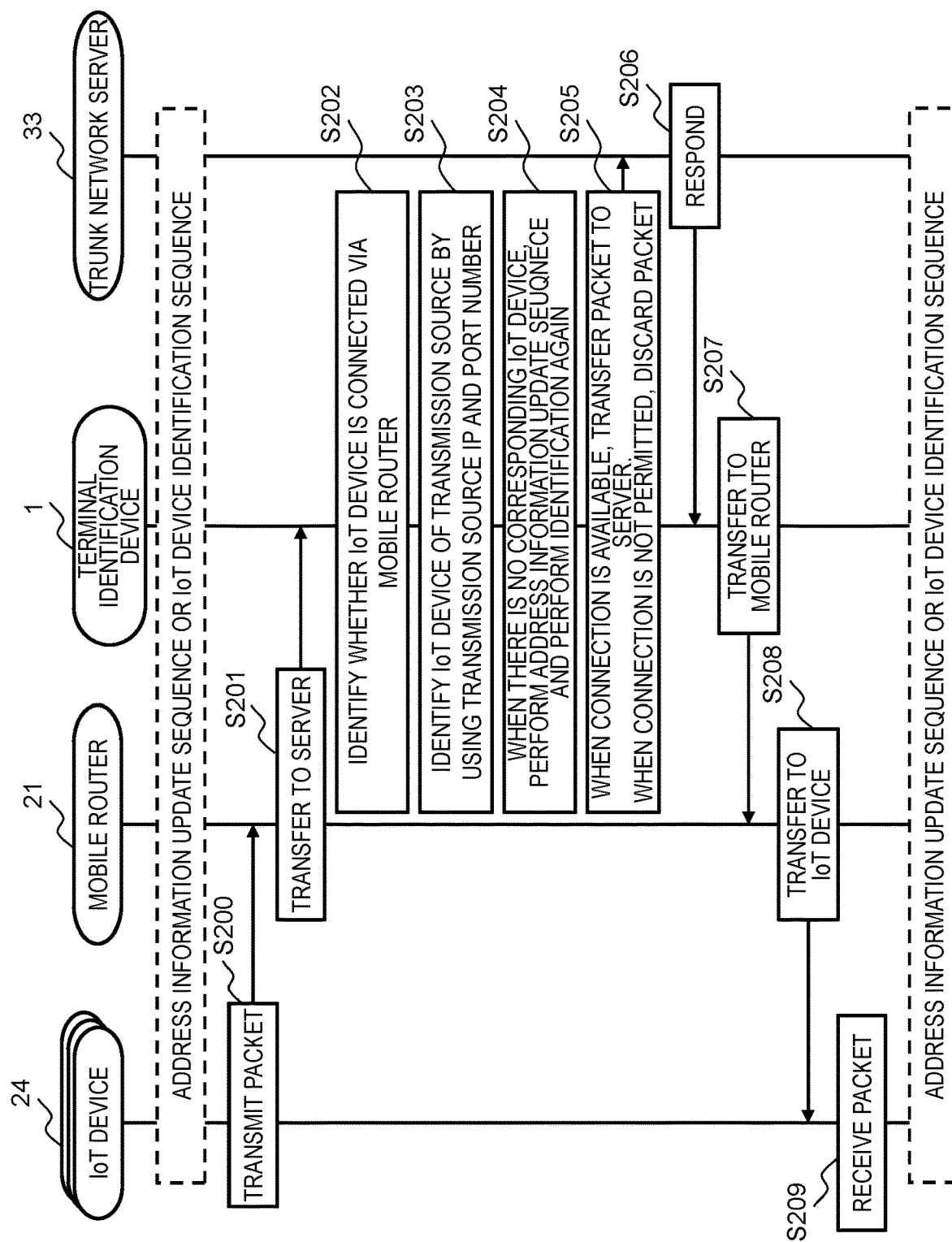
FIG. 16 is a sequence diagram of an example of an IoT device identification processing for the IoT device under control of the mobile router of the first embodiment.

FIG. 16 is a sequence diagram of an example of the IoT device identification processing for the IoT device 24 under control of the mobile router of the first embodiment. The IoT device identification processing illustrated in FIG. 16 is performed after the address information update sequence and after another IoT device identification sequence.

First, the IoT device 24 under control of the mobile router transmits a packet to the trunk network server 33.

The mobile router 21 converts a transmission source IP address and a transmission source port number of the packet transmitted from the IoT device 24 under control of the mobile router from the IP address and the port number of the IoT device 24 under control of the mobile router into the IP address and the port number of the mobile router 21 by the NAPT conversion function, registers a correspondence relationship in the NAPT table 217, and then, transfers the packet to the trunk network server 33 (S201).

The terminal identification device 1 searches for the local 5G side IP address 150 of the mobile router management table 15 by using the transmission source IP address of the packet in order to identify whether the transmission source is the IoT device 24 under control of the mobile router or the IoT device 22. In FIG. 16, since the transmission source is the IoT device 24 under control of the mobile router, there is an entry, and the process proceeds to step S203 (S202).

The IoT device identification unit 11 of the terminal identification device 1 searches for the local 5G side IP address 170 and the mobile router port number 171 of the IoT device identification table 17 by using the transmission source IP address and the port number of the packet (S203). In a case where there is no matching entry, the process proceeds to step S204, and the address information update sequence is performed. In a case where there is a matching entry, the process proceeds to step S205. Even when there is no matching entry in S203, the IoT device 24 may be decided to be connection unavailable without performing the address information update sequence in step S204. The address information update sequence (step S204) may be performed a plurality of times.

In a case where there is no matching entry in S203, the IoT device identification unit 11 performs the address information update sequence to update the IoT device identification table 17, and then, searches again for the local 5G side IP address 170 and the mobile router port number 171 in the IoT device identification table 17 by using the transmission IP address and the port number of the packet. In a case where there is a matching entry in the IoT device identification table 17, the process proceeds to S205. In a case where there is no matching entry in the IoT device identification table 17, the IoT device identification unit 11 discards the packet (S204).

In a case where the connection availability 173 of the entry is available, the IoT device identification unit 11 of the terminal identification device 1 transfers the packet to the trunk network server 33. In a case where the connection availability 173 of the entry is unavailable, the IoT device identification unit 11 discards the packet (S205).

The trunk network server 33 receives the packet, performs predetermined processing, and then, returns a response to the mobile router 21 (S206).

The IoT device identification unit 11 of the terminal identification device 1 performs header processing on the received packet, and transfers the processed packet to the mobile router 21 (S207).

The mobile router 21 searches for the local 5G side IP address 2170 and the local 5G side port number 2171 of the NAPT table 217 by using the destination IP address and the port number of the received packet, rewrites the destination IP address and the port number by using the LAN side IP address 2172 and the LAN side port number 2173 of a matching entry, and transfers the packet to the IoT device 24 under control of the mobile router. In a case where there is no matching entry, the mobile router 21 discards the packet (S208).

By the above processes, the IoT device 24 under control of the mobile router can communicate with the trunk network server 33 after receiving identification and control of connection availability by the terminal identification device 1 (S209).

Thereafter, the IoT device identification sequence is repeatedly performed for each packet transmission from the IoT device 24 under control of the mobile router.

Figure 17:
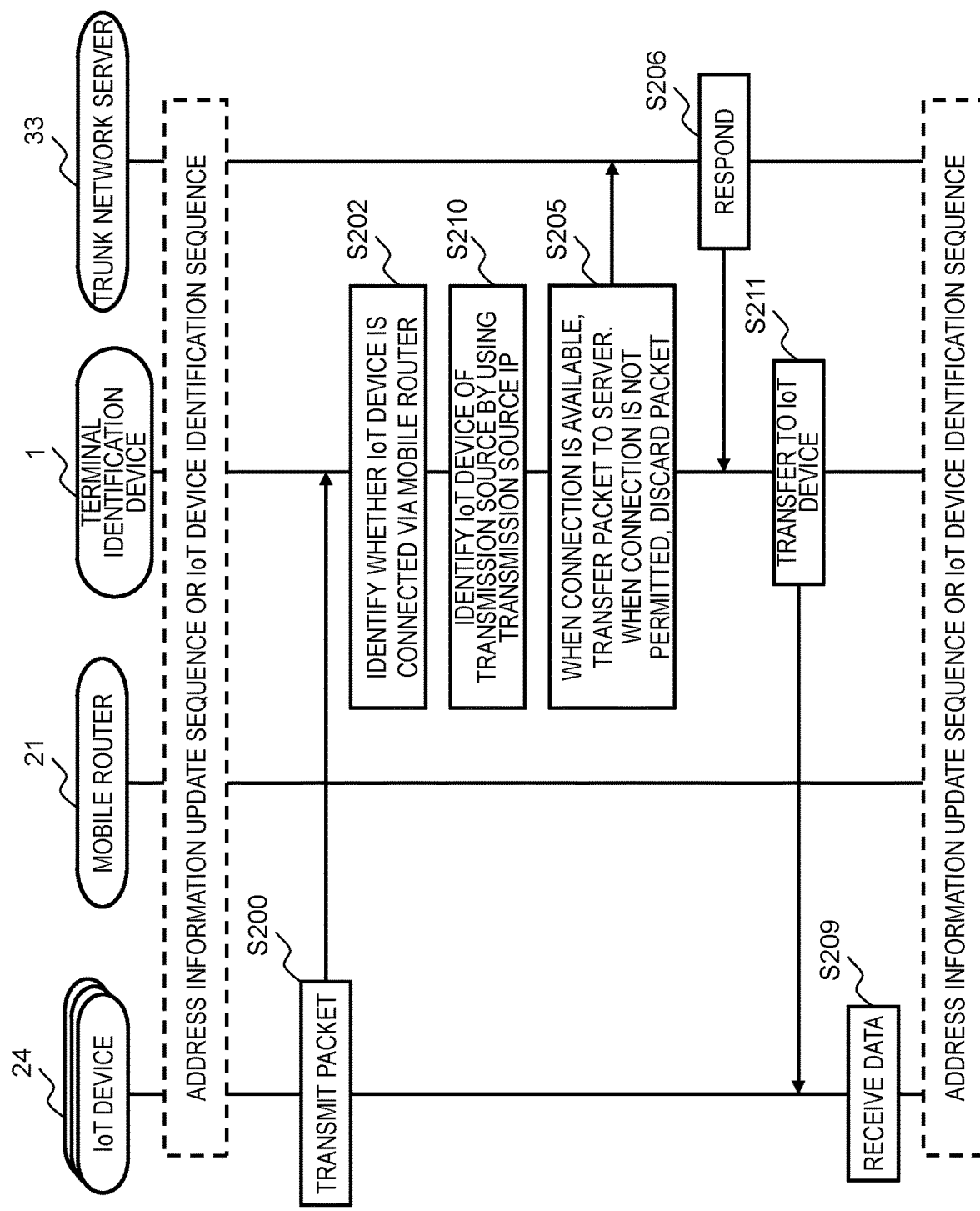
FIG. 17 is a sequence diagram of an example of the IoT device identification processing for the IoT device of the first embodiment.

FIG. 17 is a sequence diagram of an example of the IoT device identification processing for the IoT device 22 of the first embodiment. The IoT device identification processing illustrated in FIG. 17 is performed after the address information update sequence or another IoT device identification sequence.

First, the IoT device 22 transmits the packet to the trunk network server 33 (S200).

The terminal identification device 1 searches for the local 5G side IP address 150 of the mobile router management table 15 by using the transmission source IP address in order to identify whether the transmission source is the IoT device 24 under control of the mobile router or the IoT device 22 not under control of the mobile router. In FIG. 17, since the transmission source is the IoT device 22 not under control of the mobile router, there is no entry, and the process proceeds to step S210 (S202).

The IoT device identification unit 11 of the terminal identification device 1 searches for the local 5G side IP address 170 of the IoT device identification table 17 by using the transmission source IP address of the packet (S210).

In a case where the connection availability 173 of the entry is available, the IoT identification unit 11 of the terminal identification device 1 transfers the packet to the trunk network server 33. In a case where the connection availability 173 of the entry is unavailable, the IoT device identification unit 11 discards the packet (S205).

The trunk network server 33 receives the packet, performs predetermined processing, and then, returns a response to the mobile router 21 (S206).

The IoT device identification unit 11 of the terminal identification device 1 performs header processing on the received packet, and transfers the processed packet to the IoT device 22 (S211).

By the above processes, the IoT device 22 can communicate with the trunk network server 33 after receiving identification and control of connection availability by the terminal identification device 1 (S209).

Thereafter, the IoT device identification sequence is repeatedly performed for each packet transmission from the IoT device 24 under control of the mobile router.

Figure 18:
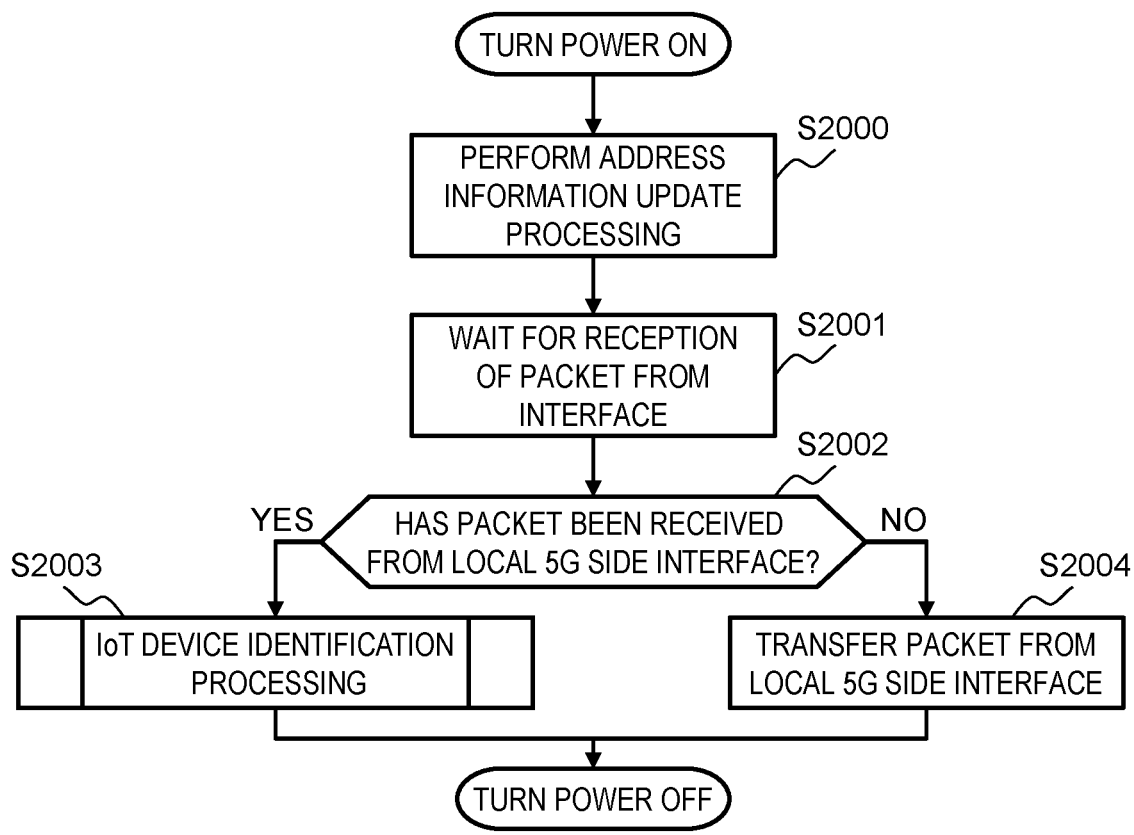
FIG. 18 is a flowchart of an example of the IoT device identification processing including the address information update processing.

FIG. 18 is a flowchart of an example of the IoT device identification processing including the address information update processing.

First, in the address information update unit 13 of the terminal identification device 1, the address information update processing is performed (see FIGS. 10, 11, and 12), and updates the IoT device identification table 17 (S2000).

Thereafter, the IoT device identification unit 11 waits for reception of the packet from the local 5G side interface 10 or the trunk network side interface 12 (S2001). Upon receiving the packet, the IoT device identification unit 11 decides the interface that has received the packet (S2002). In a case where the interface that has received the packet is the local 5G side interface 10 (Yes in S2002), the IoT device identification unit 11 performs the IoT device identification processing (see FIG. 19). On the other hand, In a case where the interface that has received the packet is the trunk network side interface 12 (No in S2002), the IoT device identification unit 11 performs header processing and transfers the packet from the local 5G side interface (S2004).

Figure 19:
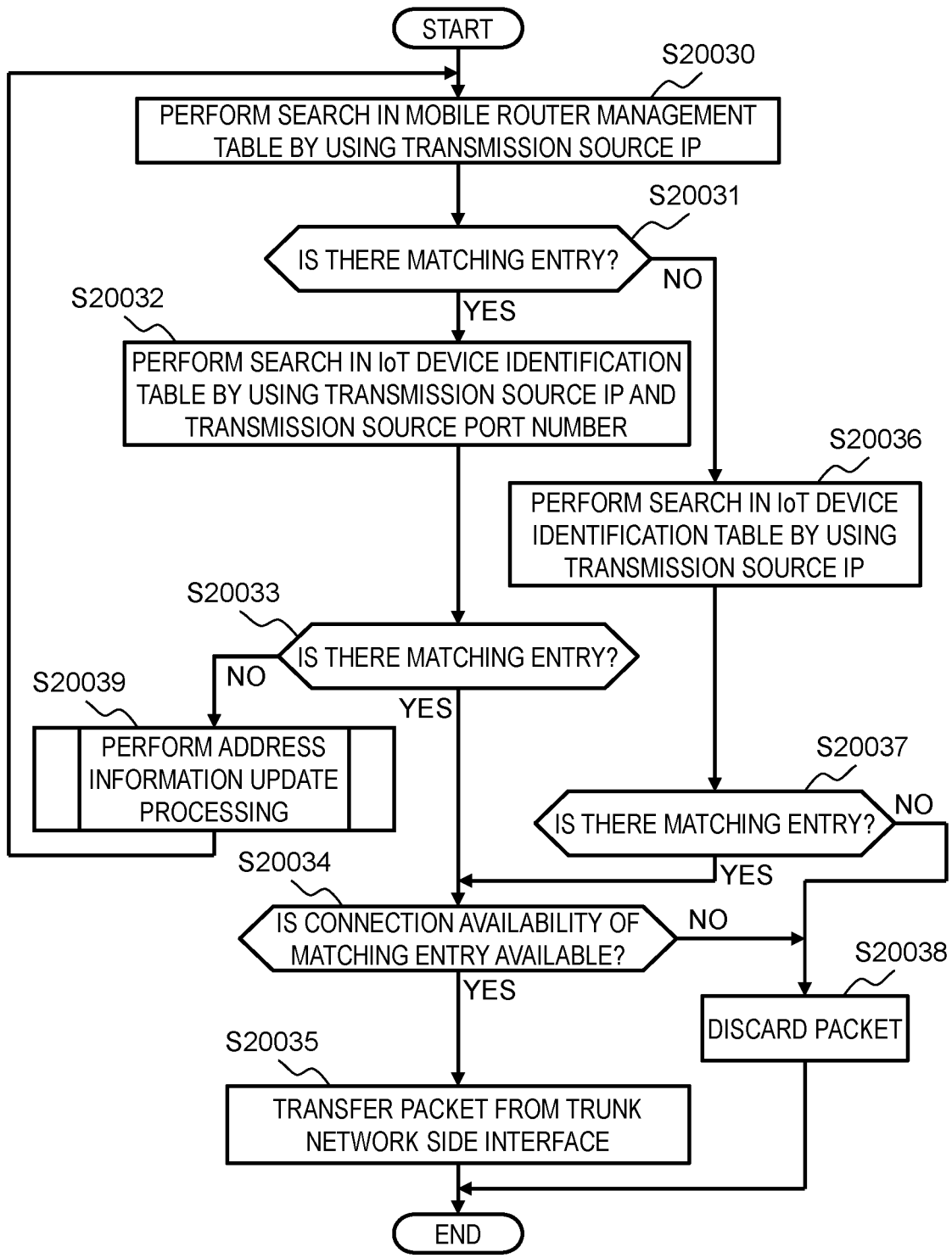
FIG. 19 is an example of a flowchart of the IoT device identification processing.

FIG. 19 is an example of a flowchart of the IoT device identification processing.

The IoT device identification unit 11 of the terminal identification device 1 searches for the local 5G side IP address 150 of the mobile router management table by using the transmission source IP address of the reception packet (S20030), and decides whether the transmission source IoT device is the IoT device 24 under control of the mobile router or the IoT device 22 not under control of the mobile router (S20031).

In a case where there is a matching entry (Yes in S20031), since the transmission source IoT device is the IoT device 24 under control of the mobile router, the IoT device identification unit 11 searches for the local 5G side IP address 170 and the mobile router port number 171 in the IoT device identification table 17 by using the transmission source IP address and the port number of the packet (S20032), and decides whether there is a matching entry (S20033). In a case where there is a matching entry (Yes in S20033), the process proceeds to step S20034. In a case where there is no matching entry (No in S20033), the IoT device identification unit 11 performs the address information update processing and updates the IoT device identification table 17, and the process proceeds to step S20030 again.

In a case where there is no entry including the transmission source IP address of the reception packet in the mobile router management table 15 (No in S20031), since the transmission source IoT device is the IoT device 22 not under control of the mobile router, the IoT device identification unit 11 searches for the local 5G side IP address 170 in the IoT device identification table 17 by using the transmission source IP address of the packet (S20036), and decides whether there is a matching entry (S20037). In a case where there is a matching entry (Yes in S20037), the process proceeds to step S20034. In a case where there is no matching entry (No in S20037), the IoT device identification unit 11 discards the packet (S20038).

In a case where there is an entry including the transmission source IP address and the port number of the packet in the IoT device identification table 17 (Yes in S20033), or in a case where there is an entry including the transmission source IP address of the packet in the IoT device identification table 17 (Yes in S20037), the IoT device identification unit 11 decides whether the connection availability 174 of the entry is available (S20034). In a case where the connection availability 174 of the entry is available (Yes in S20034), the IoT device identification unit 11 transfers the packet from the trunk network side interface 12 (S20035). In a case where the connection availability 174 of the entry is unavailable (No in S20034), the IoT device identification unit 11 discards the packet (S20038).

By the above processes, the IoT device 24 under control of the mobile router and the IoT device 22 not under control of the mobile router can communicate with the trunk network server 33 after receiving identification and control of connection availability by the terminal identification device 1.

As described above, in the first embodiment of the present invention, in a case where the local 5G network and the trunk network are interconnected, the IoT device connected to the trunk network can be identified via the address conversion function and the connection availability to the trunk network for each IoT device can be controlled The terminal identification device 1 uses the address information (IP address and port number) of the mobile router 21 to request the mobile router 21 for the identification (MAC address) of the IoT device 24, and uses the address information of the mobile router 21 in the local 5G network 2 acquired from the mobile router 21 and the identifier of the IoT device 24 to register or update the IoT device identification table 17, so that the IoT device identification table 17 can be dynamically updated as necessary.

In a case where the address information (IP address and port number) of the mobile router 21 added to data transferred from the local 5G network 2 to the trunk network 3 is not registered in the IoT device identification table 17, the terminal identification device 1 acquires the identifier of the terminal that transmits the data and registers the identifier in the IoT device identification table 17, so that the IoT device identification table 17 can be updated in real time by using the information of the mobile router 21.

Second Embodiment

Next, a second embodiment will be described. In the second embodiment, the terminal identification device 1 receives a setting input from the authentication unit 5 in the trunk network 3 in addition to the setting input from the setting terminal 4, and registers the connection availability management table 16. In the second embodiment, the components and functions same as those in the first embodiment as described above are denoted with the same reference numerals and redundant descriptions will be omitted.

Figure 20:
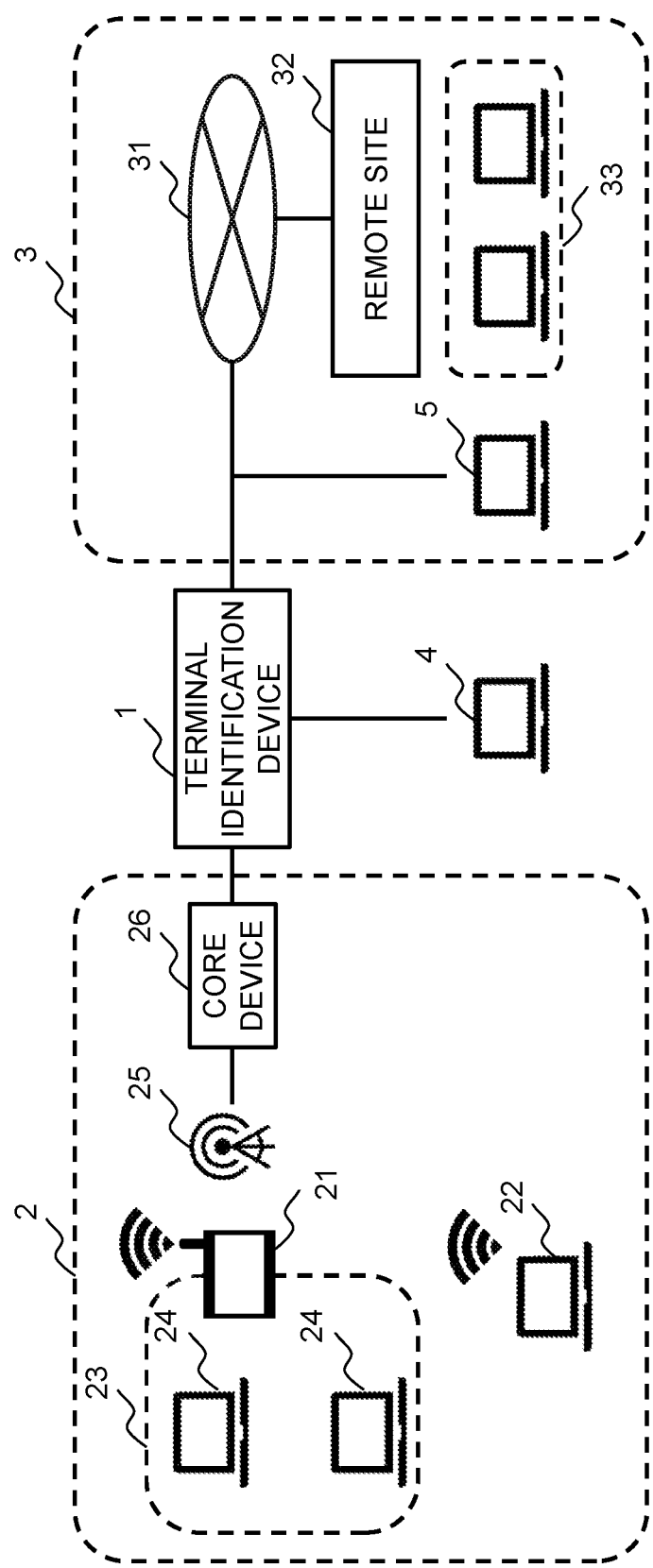
FIG. 20 is a diagram illustrating a network system configuration example of a second embodiment.

FIG. 20 is a diagram illustrating a network system configuration example of the second embodiment.

The network system of the second embodiment exemplified in FIG. 20 includes the trunk network 3, the local 5G network 2, the terminal identification device 1 installed in between the trunk network 3 and the local 5G network 2, and the authentication unit 5. The terminal identification device 1 is only required to be installed at a position logically between the trunk network 3 and the local 5G network 2, the position being a position in which the packet transferred between the trunk network 3 and the local 5G network 2 passes. The authentication unit 5 is connected to the terminal identification device 1, receives the authentication request message from the terminal identification device 1, and transmits a response message including the identifier of the IoT device 24 under control of the mobile router or the IoT device 22 not under control of the mobile router for which connection to the trunk network 3 is permitted, to the terminal identification device 1. As a result, the connection availability of the IoT device to the trunk network 3 can be managed by the authentication unit 5 of the trunk network 3.

Figure 21:
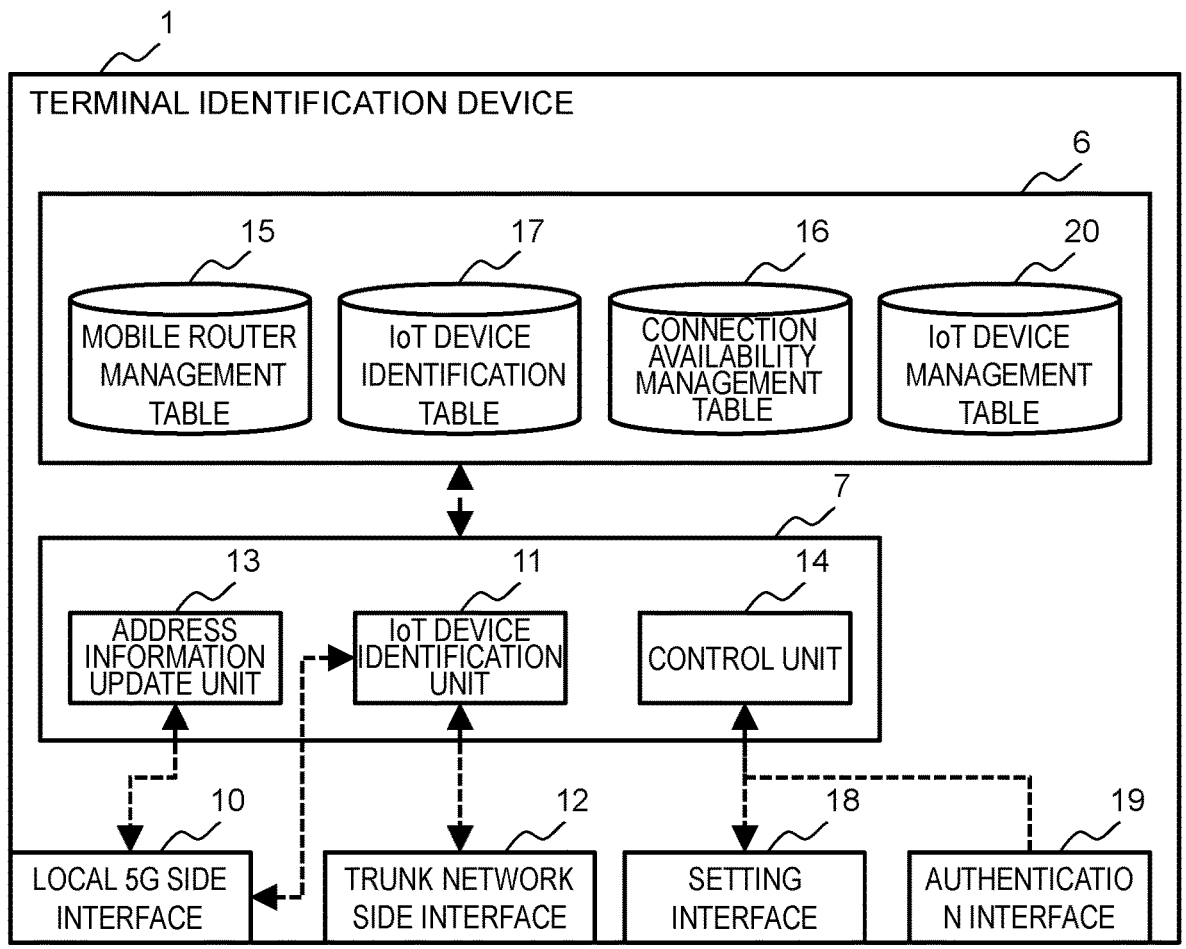
FIG. 21 is a diagram illustrating a configuration example of a terminal identification device of the second embodiment.

FIG. 21 is a diagram illustrating a configuration example of the terminal identification device 1 of the second embodiment.

The terminal identification device 1 of the second embodiment includes a plurality of types of physical hardware resources such as a local 5G side interface 10, an IoT device identification unit 11, a trunk network side interface 12, the storage device 6, an authentication interface 19, the IoT device management table 20, and a processor 7 connected to the components.

The authentication interface 19 is an interface that connects the terminal identification device 1 to the authentication unit 5. The IoT device management table holds the identifier of the IoT device 24 under control of the mobile router and the IoT device 22 not under control of the mobile router for which authentication is requested to the authentication unit 5 as the IoT device identifier 200. The IoT device management table 20 is set from the setting terminal 4 on the basis of a setting input by the network administrator through the user interface 40 (see FIG. 15). The configuration of the IoT device management table 20 will be described later with reference to FIG. 22.

The control unit 14 achieved by the processor 7 receives a setting input from the setting terminal 4 and the authentication unit 5 in addition to the functions described in the first embodiment, and controls operation of the terminal identification device 1, for example, controls the data registration to the mobile router management table 15, the connection availability management table 16, and the IoT device identification table 17. The control unit 14 transmits an authentication request message for the IoT device identifier 200 input as an entry to the IoT device management table 20, to the authentication unit 5. Thereafter, the control unit 14 registers the IoT device identifier 160 of the connection availability management table 16 on the basis of the response message received from the authentication unit 5.

Figure 22:
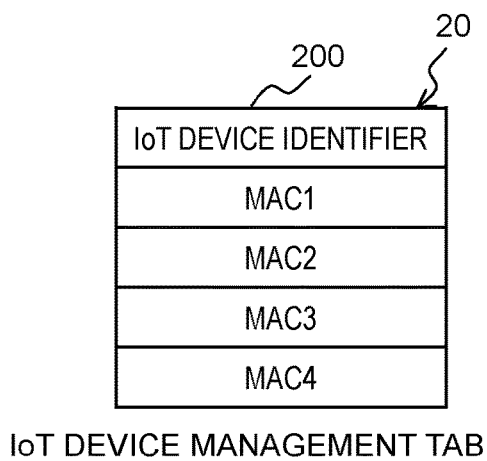
FIG. 22 is a diagram illustrating a configuration example of an IoT device management table of the second embodiment.

FIG. 22 is a diagram illustrating a configuration example of the IoT device management table 20 of the second embodiment.

The IoT device management table 20 holds the identifier of the IoT device 24 under control of the mobile router and the IoT device 22 not under control of the mobile router as the IoT device identifier 200.

Figure 23:
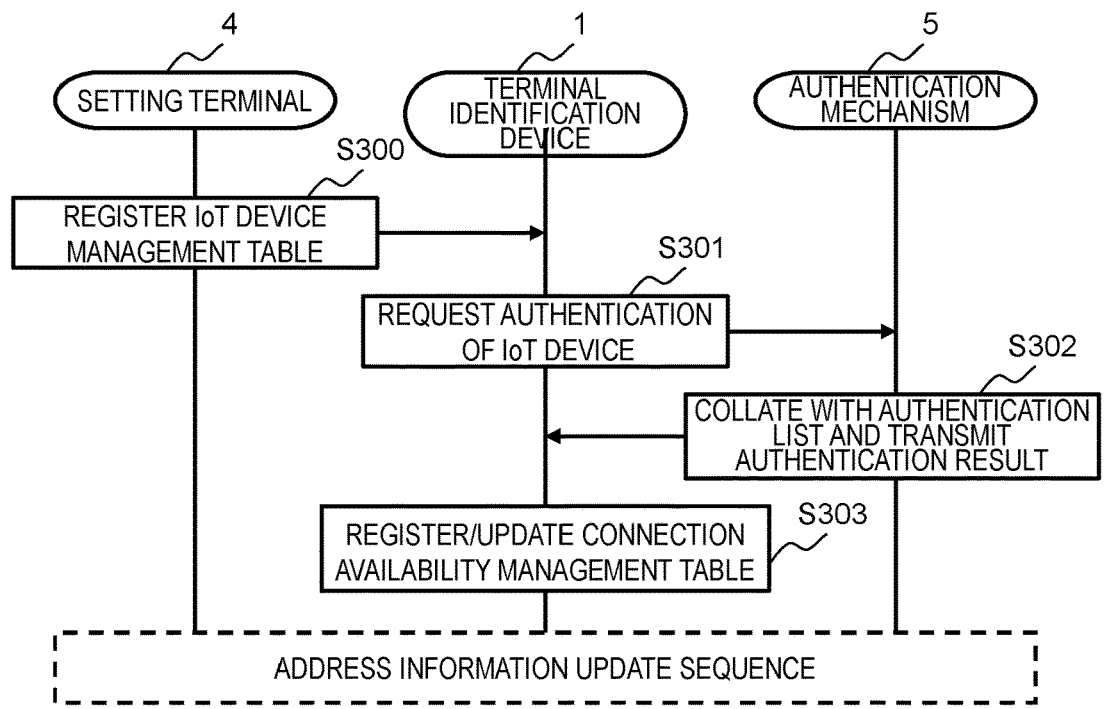
FIG. 23 is a sequence diagram of an example of an IoT device authentication processing.

FIG. 23 is a sequence diagram of an example of the IoT device authentication processing.

In the IoT device authentication processing, the authentication request message of the IoT device 24 under control of the mobile router and the IoT device 22 not under control of the mobile router is transmitted to the authentication unit 5 on the basis of the IoT device identifier 200 input as an entry to the IoT device management table 20, and the IoT device identifier 160 of the connection availability management table 16 is registered on the basis of the response message.

First, the setting terminal 4 receives a setting input by the network administrator, and registers the identifier of the IoT device 24 under control of the mobile router and the identifier of the IoT device 22 not under control of the mobile router for which the authentication request to the authentication unit 5 is performed, in the IoT device identifier 200 of the IoT device management table 20 (S300).

Next, the control unit 14 of the terminal identification device 1 causes the IoT device identifier 200 in the IoT device management table 20 to be included in the authentication request message and transmits the authentication request message from the authentication interface 19 to the authentication unit 5 (S301). At this time, the terminal identification device 1 may request authentication for each MAC address of the IoT device 24, or may request authentication for all IoT devices 24 under control of the mobile router by transmitting the authentication request message including the IoT device identification table 17 to the authentication unit 5.

The authentication unit 5 collates a list of the IoT device identifiers for which the authentication is permitted by using the IoT device identifier 200 included in the authentication request message, causes the identifier of the IoT device for which connection to the trunk network 3 is permitted to be included in the response message, and transmits the response message to the terminal identification device 1 (S302).

The control unit 14 of the terminal identification device 1 receives the response message from the authentication unit 5, through the authentication interface 19. The control unit 14 registers the identifier of the IoT device for which connection to the trunk network 3 is permitted, included in the response message in the IoT device identifier 160 of the connection availability management table 16. At this time, in a case where there is an entry that the IoT device identifier 160 matches in the connection availability management table 16, the control unit 14 updates the entry (S303).

Figure 24:
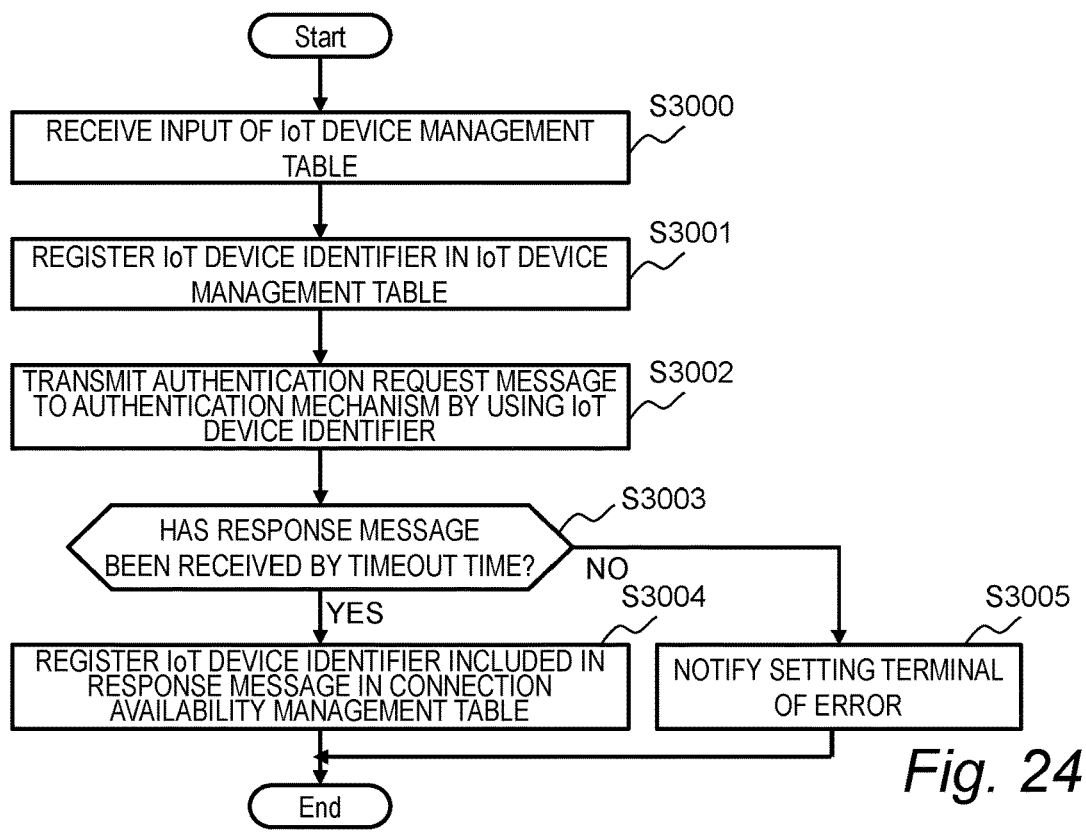
FIG. 24 is a flowchart of an example of the IoT device authentication processing.

FIG. 24 is a flowchart of an example of the IoT device authentication processing.

First, the control unit 14 of the terminal identification device 1 receives registration of the IoT device management table 20 from the setting terminal 4 (S3000). The setting terminal 4 receives a setting input by the network administrator, and registers the identifier of the IoT device 24 under control of the mobile router and the IoT device 22 not under control of the mobile router for which authentication to the authentication unit 5 is requested, in the IoT device identification 200 of the IoT device management table 20 (S3001).

The control unit 14 of the terminal identification device 1 causes the IoT device identifier 200 of the IoT device management table 20 to be included in the authentication request message, transmits the authentication request message to the authentication unit 5 (S3002), and decides whether a response message can be received within a timeout time set from the setting terminal 4 (S3003).

In a case where the response message is received (Yes in S3003), the control unit 14 of the terminal identification device 1 registers the identifier of the IoT device for which connection to the trunk network 3 is permitted, included in the response message, in the IoT device identifier 160 of the connection availability management table 16. At this time, in a case where there is an entry that the IoT device identifier 160 matches in the connection availability management table 16, the control unit 14 updates the entry (S3004). In a case where the response message is not received (No in S3003), the control unit 14 notifies the setting terminal 4 of an error (S3005).

As described above, in the second embodiment of the present invention, in addition to the effects of the first embodiment, information on the authentication availability of the IoT devices 22, 24 is acquired from the authentication unit 5, so that the connection availability of the IoT devices 22, 24 to the trunk network 3 can be collectively managed on the trunk network 3 side.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. A network system that transfers data, the network system comprising:
   a first network;
   a second network connected with the first network and to which a server is connected;
   a third network connected with the first network and in which a terminal having address information different from address information of the first network is accommodated; and
   at least one processor which when executing at least one program configures the at least one processor to:
   determine connection availability of the terminal to the second network;
   convert address information attached to data transferred between the first network and the third network;
   convert the address information of a gateway device in the first network attached to the data transferred from the first network to the third network, into address information of the terminal in the third network, and convert the address information of the terminal in the third network attached to the data transferred from the third network to the first network, into the address information of the gateway device in the first network;
   hold, in a terminal identification device, terminal identification information in which the address information of the gateway device in the first network, an identifier of the terminal, and the connection availability of the terminal to the second network are associated with each other;
   determine the connection availability of the terminal to the second network based on the terminal identification information; and
   acquire the address information of the gateway device in the first network and the identifier of the terminal from the gateway device to register or update the terminal identification information.

2. The network system according to claim 1,
   wherein the address information is a combination of an IP address and a port number,
   the terminal identification information is information in which the IP address and the port number of the gateway device in the first network, the identifier of the terminal, and the connection availability of the terminal to the second network are associated with each other,
   the port number of the gateway device is set to a value different for each identifier of the terminal, and
   the at least one processor is further configured to refer to the terminal identification information by using the IP address and the port number of the gateway device in the first network attached to data transferred from the first network to the second network, and determine the connection availability of the terminal to the second network.

3. The network system according to claim 1,
   wherein the terminal device is configured to
   request the gateway device for the identifier of the terminal by using the address information of the gateway device, and
   register or update the terminal identification information by using the address information of the gateway device in the first network and the identifier of the terminal acquired from the gateway device.

4. The network system according to claim 1,
   the terminal identification device including
   a first interface that transmits and receives data to and from the first network,
   a second interface that transmits and receives data to and from the second network,
   wherein the at least one processor is further configured to:
   refer to the terminal identification information to determine the connection availability of the terminal to the second network; and
   acquire the address information of the gateway device in the first network from the gateway device to register or update the terminal identification information.

5. The network system according to claim 2,
   wherein, in a case where the IP address and the port number of the gateway device in the first network attached to the data transferred from the first network to the second network are not registered in the terminal identification information, the at least one processor is further configured to acquire from the gateway device the identifier of the terminal that transmits the data, and registers the identifier in the terminal identification information.

6. The network system according to claim 1,
   further comprising an authentication unit that provides authentication information of the terminal to the terminal identification device,
   wherein the at least one processor is further configured to:
   request the authentication unit for authentication of the terminal, based on the terminal identification information; and
   register or update the connection availability of the terminal to the second network in the terminal identification information, based on an authentication result acquired from the authentication unit.

7. A communication control device installed in a network system that transfers data,
   the network system including:
   a first network;
   a second network connected with the first network and to which a server is connected;
   a third network connected with the first network and in which a terminal having address information different from address information of the first network is accommodated; and
   at least one processor which when executing at least one program configures the at least one processor to:
   convert address information attached to data transferred between the first network and the third network; and
   convert the address information of a gateway device in the first network attached to the data transferred from the first network to the third network, into address information of the terminal in the third network, and convert the address information of the terminal in the third network attached to the data transferred from the third network to the first network, into the address information of the gateway device in the first network, wherein a communication control device includes:
a first interface that transmits and receives data to and from the first network,
a second interface that transmits and receives data to and from the second network, and
terminal identification information in which the address information of the gateway device in the first network, an identifier of the terminal, and connection availability of the terminal to the second network are associated with each other, and wherein the at least one processor is further configured to:
determine the connection availability of the terminal to the second network based on the terminal identification information; and
acquire the address information of the gateway device in the first network and the identifier of the terminal from the gateway device to register or update the terminal identification information.

8. A communication control method in a network system that transfers data, the network system including:
a first network;
a second network connected with the first network and to which a server is connected;
a third network connected with the first network and in which a terminal having address information different from address information of the first network is accommodated;
a terminal identification device that determines connection availability of the terminal to the second network; and
a gateway device that converts address information attached to data transferred between the first network and the third network, wherein the gateway device is configured to convert the address information of the gateway device in the first network attached to the data transferred from the first network to the third network, into address information of the terminal in the third network, and convert the address information of the terminal in the third network attached to the data transferred from the third network to the first network, into the address information of the gateway device in the first network, and the terminal identification device is configured to hold terminal identification information in which the address information of the gateway device in the first network, an identifier of the terminal, and the connection availability of the terminal to the second network are associated with each other, the communication control method comprising:
acquiring, by the terminal identification device, the address information of the gateway device in the first network and the identifier of the terminal from the gateway device to register or update the terminal identification information; and
determining, by the terminal identification device, the connection availability of the terminal to the second network based on the terminal identification information.

* * * * *